US012786078B2

(12) United States Patent
Subramanya et al.

(10) Patent No.: US 12,786,078 B2
(45) Date of Patent: Nov. 3, 2026

(54) PERFORMANCE RELATED MANAGEMENT OF ARTIFICIAL INTELLIGENCE OR MACHINE LEARNING PIPELINES IN CROSS-DOMAIN SCENARIOS

(71) Applicant: Nokia Technologies Oy, Espoo (FI)

(72) Inventors: Tejas Subramanya, Munich (DE); Borislava Gajic, Munich (DE); Dario Bega, Stuttgart (DE)

(73) Assignee: Nokia Technologies Oy, Espoo (FI)

(*) Notice: Subject to any disclaimer, the term of this patent is extended or adjusted under 35 U.S.C. 154(b) by 236 days.

(21) Appl. No.: 18/841,327

(22) PCT Filed: Mar. 7, 2022

(86) PCT No.: PCT/EP2022/055685
§ 371 (c)(1),
(2) Date: Aug. 23, 2024

(87) PCT Pub. No.: WO2023/169650
PCT Pub. Date: Sep. 14, 2023

(65) Prior Publication Data
US 2025/0184241 A1 Jun. 5, 2025

(51) Int. Cl.
*H04L 12/24* (2006.01)
*G06F 9/50* (2006.01)
(Continued)

(52) U.S. Cl.
CPC ........ *H04L 41/5019* (2013.01); *G06F 9/5083* (2013.01); *G06F 9/542* (2013.01);
(Continued)

(58) Field of Classification Search
CPC ..... H04L 41/5019; H04L 41/16; G06F 9/542; G06F 11/3409; G06F 9/5083; G06F 11/302; G06N 20/00
(Continued)

(56) References Cited

U.S. PATENT DOCUMENTS 11,182,691 B1 * 11/2021 Zhang .................... G06N 20/20
11,544,796 B1 * 1/2023 Mohamed ............ G06N 3/0985
(Continued)

FOREIGN PATENT DOCUMENTS

CN 113094985 A * 7/2021 ............. G06F 17/16
CN 113128594 A * 7/2021 ........... G06F 18/214
(Continued)

OTHER PUBLICATIONS

"What is a Container?", Docker, Retrieved on Oct. 6, 2023, Webpage available at : https://www.docker.com/resources/what-container/.
(Continued)

*Primary Examiner* — Ario Etienne
*Assistant Examiner* — Elizabeth Kassa
(74) *Attorney, Agent, or Firm* — Barta Jones, PLLC

(57) ABSTRACT

There are provided measures for performance related management of artificial intelligence or machine learning pipelines in cross-domain scenarios. Such measures exemplarily comprise transmitting a first artificial intelligence or machine learning performance related message towards a second network entity managing lifecycles of artificial intelligence or machine learning pipelines in a first network domain in a network, and receiving a second artificial intelligence or machine learning performance related message from said second network entity, wherein said first artificial intelligence or machine learning performance related message comprises a first information element including at least one first cross-domain network service involved artificial intelligence or machine learning pipeline performance related parameter.

20 Claims, 15 Drawing Sheets

(51) Int. Cl.

| | |
|---|---|
| ***G06F 9/54*** | (2006.01) |
| ***G06F 11/30*** | (2006.01) |
| ***G06F 11/34*** | (2006.01) |
| ***H04L 41/0803*** | (2022.01) |
| ***H04L 41/16*** | (2022.01) |
| ***H04L 41/5019*** | (2022.01) |

(52) U.S. Cl.
CPC ........ *G06F 11/302* (2013.01); *G06F 11/3409* (2013.01); *H04L 41/16* (2013.01)

(58) Field of Classification Search
USPC .......................................................... 709/201
See application file for complete search history.

(56) References Cited

U.S. PATENT DOCUMENTS

| | | | | |
|---|---|---|---|---|
| 2013/0138816 | A1* | 5/2013 | Kuo | G06F 9/5011 709/226 |
| 2018/0359172 | A1* | 12/2018 | Yadav | G06N 20/00 |
| 2021/0091999 | A1* | 3/2021 | Mirza | G06N 20/00 |
| 2021/0211352 | A1* | 7/2021 | Parvataneni | G06N 20/00 |
| 2022/0198339 | A1* | 6/2022 | Zhao | G06F 18/214 |
| 2022/0342988 | A1* | 10/2022 | Brunza | H04L 63/1408 |
| 2023/0056256 | A1* | 2/2023 | Klotsche | H04L 5/006 |
| 2023/0162023 | A1* | 5/2023 | Koike Akino | G06N 3/0455 706/25 |

FOREIGN PATENT DOCUMENTS

| | | | | |
|---|---|---|---|---|
| CN | 117813846 | A * | 4/2024 | H04L 41/0226 |
| WO | 2022/237963 | A1 | 11/2022 | |
| WO | 2023/006188 | A1 | 2/2023 | |
| WO | 2023/015448 | A1 | 2/2023 | |
| WO | 2023/016635 | A1 | 2/2023 | |
| WO | 2023/169645 | A1 | 9/2023 | |
| WO | 2023/169646 | A1 | 9/2023 | |

OTHER PUBLICATIONS

"What is Kubeflow?", Kubeflow, Retrieved on Oct. 6, 2023, Webpage available at : https://www.kubeflow.org/.
"Regulation of the European Parliament and of the Council Laying Down Harmonised Rules on Artificial Intelligence (Artificial Intelligence Act) and Amending Certain Union Legislative Acts", European Commission, Apr. 2021, 125 pages.
"Information technology—Artificial intelligence—Overview of trustworthiness in artificial intelligence", ISO/IEC TR 24028, First edition, May 2020, 50 pages.
"Adversarial Robustness Toolbox (ART) v1.16", github, Retrieved on Oct. 6, 2023, Webpage available at : https://github.com/Trusted-AI/adversarial-robustness-toolbox.
"Explainable AI", Google Cloud, Retrieved on Oct. 6, 2023, Webpage available at : https://cloud.google.com/explainable-ai.
"Responsible AI Toolkit", TensorFlow, Retrieved on Oct. 6, 2023, Webpage available at : https://www.tensorflow.org/responsible_ai.
European Application No. 22160427.5, "Apparatus, Method, and Computer Program", filed on Mar. 7, 2022, pp. 1-34.
International Search Report and Written Opinion received for corresponding Patent Cooperation Treaty Application No. PCT/EP2022/055685, dated Nov. 7, 2022, 13 pages.
Guerzoni et al., "Multi-domain Orchestration and Management of Software Defined Infrastructures: a Bottom-Up approach", European Conference on Networks and Communications, 2016, 6 pages.

* cited by examiner

PERFORMANCE RELATED MANAGEMENT OF ARTIFICIAL INTELLIGENCE OR MACHINE LEARNING PIPELINES IN CROSS-DOMAIN SCENARIOS

RELATED APPLICATION

This application claims priority to PCT Patent Application No. PCT/EP2022/055685, filed 7 Mar. 2022, which is incorporated herein by reference in its entirety.

FIELD

Various example embodiments relate to performance related management of artificial intelligence or machine learning pipelines in cross-domain scenarios. More specifically, various example embodiments exemplarily relate to measures (including methods, apparatuses and computer program products) for realizing performance related management of artificial intelligence or machine learning pipelines in cross-domain scenarios.

BACKGROUND

The present specification generally relates to artificial intelligence (AI)/machine learning (ML) pipelines in cross-domain scenarios and the management thereof in particular for interoperable and multi-vendor environments.

An AI or ML pipeline helps to automate AI/ML workflows by splitting them into independent, reusable and modular components that can then be pipelined together to create a (trained) (AI/ML) model. An AI/ML pipeline is not a one-way flow, i.e., it is iterative, and every step is repeated to continuously improve the accuracy of the model and achieve a successful algorithm.

FIG. 8 shows a schematic diagram of an example of an AI/ML pipeline.

An AI/ML workflow might consist of at least the following three components illustrated in FIG. 8, namely, a data stage (e.g., data collection, data preparation/preprocessing), a training stage (e.g., hyperparameter tuning), and an inference stage (e.g., model evaluation).

With AI/ML pipelining and the recent push for microservices architectures (e.g., containers or container virtualization), each AI/ML workflow component is abstracted into an independent service that relevant stakeholders (e.g., data engineers, data scientists) can independently work on.

Besides, an AI/ML pipeline orchestrator shown in FIG. 8 can manage the AI/ML pipelines' lifecycle (e.g., commissioning, scaling, decommissioning).

Subsequently, some basics of trustworthy artificial intelligence are explained.

For AI/ML systems to be widely accepted, they should be trustworthy in addition to meeting performance requirements (e.g., accuracy). The High-level Expert Group (HLEG) on AI has developed the European Commission's Trustworthy AI (TAI) strategy.

In April 2021, the European Commission presented the EU Artificial Intelligence Act or the regulatory framework for AI by setting out horizontal rules for the development, commodification and use of AI-driven products, services and systems within the territory of the EU. The Act seeks to codify the high standards of the EU Trustworthy AI paradigm, which requires AI to be legally, ethically and technically robust, while respecting democratic values, human rights and the rule of law. The draft regulation provides seven critical Trustworthy AI requirements for high-risk AI systems that apply to all industries:

1. Transparency: Include traceability, explainability and communication.
2. Diversity, non-discrimination and fairness: Include the avoidance of unfair bias, accessibility and universal design, and stakeholder participation.
3. Technical robustness and safety: Include resilience to attack and security, fall back plan and general safety, accuracy, reliability and reproducibility.
4. Privacy and data governance: Include respect for privacy, quality and integrity of data, and access to data.
5. Accountability: Include auditability, minimization and reporting of negative impact, trade-offs and redress.
6. Human agency and oversight: Include fundamental rights, human agency and human oversight.
7. Societal and environmental wellbeing: Include sustainability and environmental friendliness, social impact, society and democracy.

Additionally, International Organization for Standardization (ISO)/International Electrotechnical Commission (IEC) has also published a technical report on 'Overview of trustworthiness in artificial intelligence'. Early efforts in the open-source community are also visible towards developing TAI frameworks/tools/libraries such as IBM AI360, Google Explainable AI and TensorFlow Responsible AI.

However, while such knowledge in relation to trustworthiness of AI/ML exist, no approaches for implementing control and evaluation of performance of AI/ML pipelines in cross-domain management and orchestration architectures are known.

Hence, the problem arises that control and evaluation of performance of AI/ML pipelines in cross-domain scenarios in particular for interoperable and multi-vendor environments is to be provided.

Hence, there is a need to provide for performance related management of artificial intelligence or machine learning pipelines in cross-domain scenarios.

SUMMARY

Various example embodiments aim at addressing at least part of the above issues and/or problems and drawbacks.

Various aspects of example embodiments are set out in the appended claims.

According to an exemplary aspect, there is provided a method of a first network entity managing artificial intelligence or machine learning pipelines in a plurality of network domains including a first network domain in a network, the method comprising transmitting a first artificial intelligence or machine learning performance related message towards a second network entity managing lifecycles of artificial intelligence or machine learning pipelines in said first network domain in said network, and receiving a second artificial intelligence or machine learning performance related message from said second network entity, wherein said first artificial intelligence or machine learning performance related message comprises a first information element including at least one first cross-domain network service involved artificial intelligence or machine learning pipeline performance related parameter.

According to an exemplary aspect, there is provided a method of a second network entity managing lifecycles of artificial intelligence or machine learning pipelines in a first network domain in a network, the method comprising receiving a first artificial intelligence or machine learning performance related message from a first network entity managing artificial intelligence or machine learning pipelines in a plurality of network domains including said first network domain in said network, and transmitting a second artificial intelligence or machine learning performance related message towards said first network entity, wherein said first artificial intelligence or machine learning performance related message comprises a first information element including at least one first cross-domain network service involved artificial intelligence or machine learning pipeline performance related parameter.

According to an exemplary aspect, there is provided a method of a third network entity responsible for fulfillment of network operator specifications in a first network domain in a network, the method comprising receiving a third artificial intelligence or machine learning performance related message from a first network entity managing artificial intelligence or machine learning pipelines in a plurality of network domains including said first network domain in said network, and transmitting a fourth artificial intelligence or machine learning performance related message towards said first network entity, wherein said third artificial intelligence or machine learning performance related message comprises a third information element including at least one third cross-domain network service involved artificial intelligence or machine learning pipeline performance related parameter, said third artificial intelligence or machine learning performance related message is a cross-domain performance configuration request, and said fourth artificial intelligence or machine learning performance related message is a cross-domain performance configuration response.

According to an exemplary aspect, there is provided an apparatus of a first network entity managing artificial intelligence or machine learning pipelines in a plurality of network domains including a first network domain in a network, the apparatus comprising transmitting circuitry configured to transmit a first artificial intelligence or machine learning performance related message towards a second network entity managing lifecycles of artificial intelligence or machine learning pipelines in said first network domain in said network, and receiving circuitry configured to receive a second artificial intelligence or machine learning performance related message from said second network entity, wherein said first artificial intelligence or machine learning performance related message comprises a first information element including at least one first cross-domain network service involved artificial intelligence or machine learning pipeline performance related parameter.

According to an exemplary aspect, there is provided an apparatus of a second network entity managing lifecycles of artificial intelligence or machine learning pipelines in a first network domain in a network, the apparatus comprising receiving circuitry configured to receive a first artificial intelligence or machine learning performance related message from a first network entity managing artificial intelligence or machine learning pipelines in a plurality of network domains including said first network domain in said network, and transmitting circuitry configured to transmit a second artificial intelligence or machine learning performance related message towards said first network entity, wherein said first artificial intelligence or machine learning performance related message comprises a first information element including at least one first cross-domain network service involved artificial intelligence or machine learning pipeline performance related parameter.

According to an exemplary aspect, there is provided an apparatus of a third network entity responsible for fulfillment of network operator specifications in a first network domain in a network, the apparatus comprising receiving circuitry configured to receive a third artificial intelligence or machine learning performance related message from a first network entity managing artificial intelligence or machine learning pipelines in a plurality of network domains including said first network domain in said network, and transmitting circuitry configured to transmit a fourth artificial intelligence or machine learning performance related message towards said first network entity, wherein said third artificial intelligence or machine learning performance related message comprises a third information element including at least one third cross-domain network service involved artificial intelligence or machine learning pipeline performance related parameter, said third artificial intelligence or machine learning performance related message is a cross-domain performance configuration request, and said fourth artificial intelligence or machine learning performance related message is a cross-domain performance configuration response.

According to an exemplary aspect, there is provided an apparatus of a first network entity managing artificial intelligence or machine learning pipelines in a plurality of network domains including a first network domain in a network, the apparatus comprising at least one processor, at least one memory including computer program code, and at least one interface configured for communication with at least another apparatus, the at least one processor, with the at least one memory and the computer program code, being configured to cause the apparatus to perform transmitting a first artificial intelligence or machine learning performance related message towards a second network entity managing lifecycles of artificial intelligence or machine learning pipelines in said first network domain in said network, and receiving a second artificial intelligence or machine learning performance related message from said second network entity, wherein said first artificial intelligence or machine learning performance related message comprises a first information element including at least one first cross-domain network service involved artificial intelligence or machine learning pipeline performance related parameter.

According to an exemplary aspect, there is provided an apparatus of a second network entity managing lifecycles of artificial intelligence or machine learning pipelines in a first network domain in a network, the apparatus comprising at least one processor, at least one memory including computer program code, and at least one interface configured for communication with at least another apparatus, the at least one processor, with the at least one memory and the computer program code, being configured to cause the apparatus to perform receiving a first artificial intelligence or machine learning performance related message from a first network entity managing artificial intelligence or machine learning pipelines in a plurality of network domains including said first network domain in said network, and transmitting a second artificial intelligence or machine learning performance related message towards said first network entity, wherein said first artificial intelligence or machine learning performance related message comprises a first information element including at least one first cross-domain network service involved artificial intelligence or machine learning pipeline performance related parameter.

According to an exemplary aspect, there is provided an apparatus of a third network entity responsible for fulfillment of network operator specifications in a first network domain in a network, the apparatus comprising at least one processor, at least one memory including computer program code, and at least one interface configured for communication with at least another apparatus, the at least one processor, with the at least one memory and the computer program code, being configured to cause the apparatus to perform receiving a third artificial intelligence or machine learning performance related message from a first network entity managing artificial intelligence or machine learning pipelines in a plurality of network domains including said first network domain in said network, and transmitting a fourth artificial intelligence or machine learning performance related message towards said first network entity, wherein said third artificial intelligence or machine learning performance related message comprises a third information element including at least one third cross-domain network service involved artificial intelligence or machine learning pipeline performance related parameter, said third artificial intelligence or machine learning performance related message is a cross-domain performance configuration request, and said fourth artificial intelligence or machine learning performance related message is a cross-domain performance configuration response.

According to an exemplary aspect, there is provided a computer program product comprising computer-executable computer program code which, when the program is run on a computer (e.g. a computer of an apparatus according to any one of the aforementioned apparatus-related exemplary aspects of the present disclosure), is configured to cause the computer to carry out the method according to any one of the aforementioned method-related exemplary aspects of the present disclosure.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables an efficient control and evaluation of performance of AI/ML pipelines in cross-domain scenarios in particular for interoperable and multi-vendor environments to thereby solve at least part of the problems and drawbacks identified in relation to the prior art.

By way of example embodiments, there is provided performance related management of artificial intelligence or machine learning pipelines in cross-domain scenarios. More specifically, by way of example embodiments, there are provided measures and mechanisms for realizing performance related management of artificial intelligence or machine learning pipelines in cross-domain scenarios.

Thus, improvement is achieved by methods, apparatuses and computer program products enabling/realizing performance related management of artificial intelligence or machine learning pipelines in cross-domain scenarios.

BRIEF DESCRIPTION OF THE DRAWINGS

In the following, the present disclosure will be described in greater detail by way of non-limiting examples with reference to the accompanying drawings, in which.

DETAILED DESCRIPTION

The present disclosure is described herein with reference to particular non-limiting examples and to what are presently considered to be conceivable embodiments. A person skilled in the art will appreciate that the disclosure is by no means limited to these examples, and may be more broadly applied.

It is to be noted that the following description of the present disclosure and its embodiments mainly refers to specifications being used as non-limiting examples for certain exemplary network configurations and deployments. Namely, the present disclosure and its embodiments are mainly described in relation to 3GPP specifications being used as non-limiting examples for certain exemplary network configurations and deployments. As such, the description of example embodiments given herein specifically refers to terminology which is directly related thereto. Such terminology is only used in the context of the presented non-limiting examples, and does naturally not limit the disclosure in any way. Rather, any other communication or communication related system deployment, etc. may also be utilized as long as compliant with the features described herein.

Hereinafter, various embodiments and implementations of the present disclosure and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to example embodiments, in general terms, there are provided measures and mechanisms for (enabling/realizing) performance related management of artificial intelligence or machine learning pipelines in cross-domain scenarios.

A framework for TAI in cognitive autonomous networks (CAN) underlies example embodiments.

Figure 9:
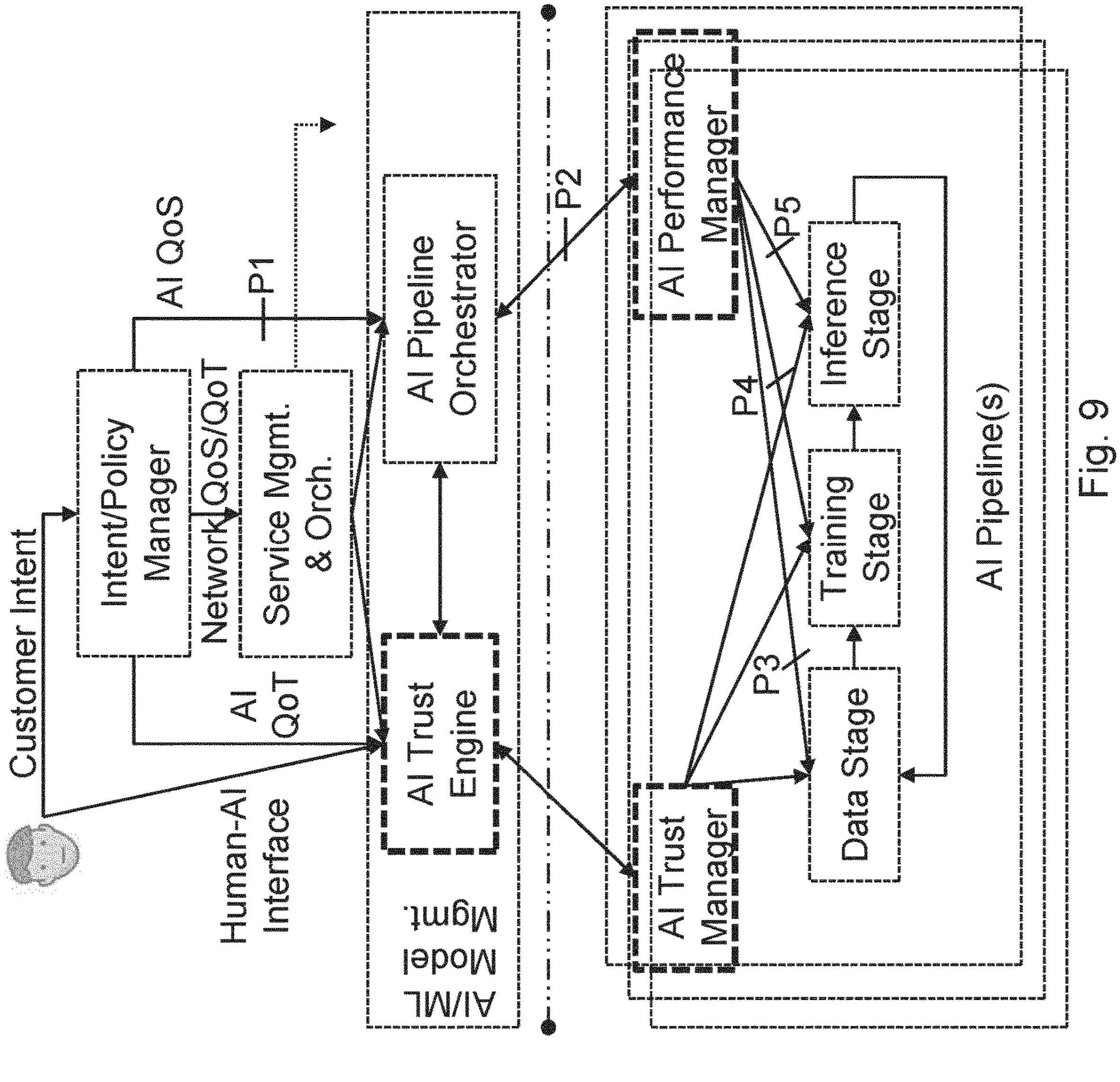
FIG. 9 shows a schematic diagram of an example of a system environment with interfaces and signaling variants according to example embodiments.

FIG. 9 shows a schematic diagram of an example of a system environment with interfaces and signaling variants according to example embodiments, and in particular illustrates such trustworthy AI/ML framework for CANs (framework for TAI in CANs)) underlying example embodiments.

As shown in FIG. 9, according to an introduced trustworthy AI/ML framework for cognitive autonomous networks, an intent/policy manager translates the customer intent into network quality of service (QoS) and network quality of trustworthiness (QoT) (e.g., service level agreement (SLA)), AI QoS (e.g., accuracy) and AI QoT (e.g., explainability, fairness, robustness) requirements and sends them to the service management and orchestration (SMO), the AI pipeline orchestrator, and the AI trust engine, respectively. Alternatively, the SMO may translate the network QoS and network QoT requirements into AI QoS and AI QoT requirements and may send them to the AI pipeline orchestrator and to the AI trust engine, respectively. The AI pipeline orchestrator and the AI trust engine may exchange information about AI QoS and AI QoT requirements with each other.

Considering that the AI pipelines deployed in the network may belong to multiple vendors, according to example embodiments, application programming interfaces (API) are exposed by the vendor-specific AI pipelines (without compromising the vendor's intellectual property rights) towards the AI pipeline orchestrator and the AI trust engine to discover the performance and trust capabilities of the AI pipeline, configure the AI pipeline according to the required AI QoS and AI QoT requirements, and to monitor/collect AI performance and AI trust related metrics from the AI pipeline.

Heretofore, according to the trustworthy AI/ML framework for CANs underlying example embodiments, APIs required for the AI trust engine to discover the AI trustworthiness capabilities via the AI trust manager of the AI pipeline, to configure the AI pipeline according to the required AI QoT via the AI trust manager, and to monitor/collect AI trustworthiness metrics and/or AI explanations related to the AI pipeline via the AI trust manager may be provided. Further, according to according to the trustworthy AI/ML framework for CANs underlying example embodiments, APIs required for the AI pipeline orchestrator to discover the performance capabilities of the AI pipeline via the AI performance manager of the AI pipeline, to (re) configure the AI pipeline according to the required AI QoS via the AI trust manager, and to monitor/collect AI performance metrics related to the AI pipeline via the AI performance manager may be provided.

Figure 10:
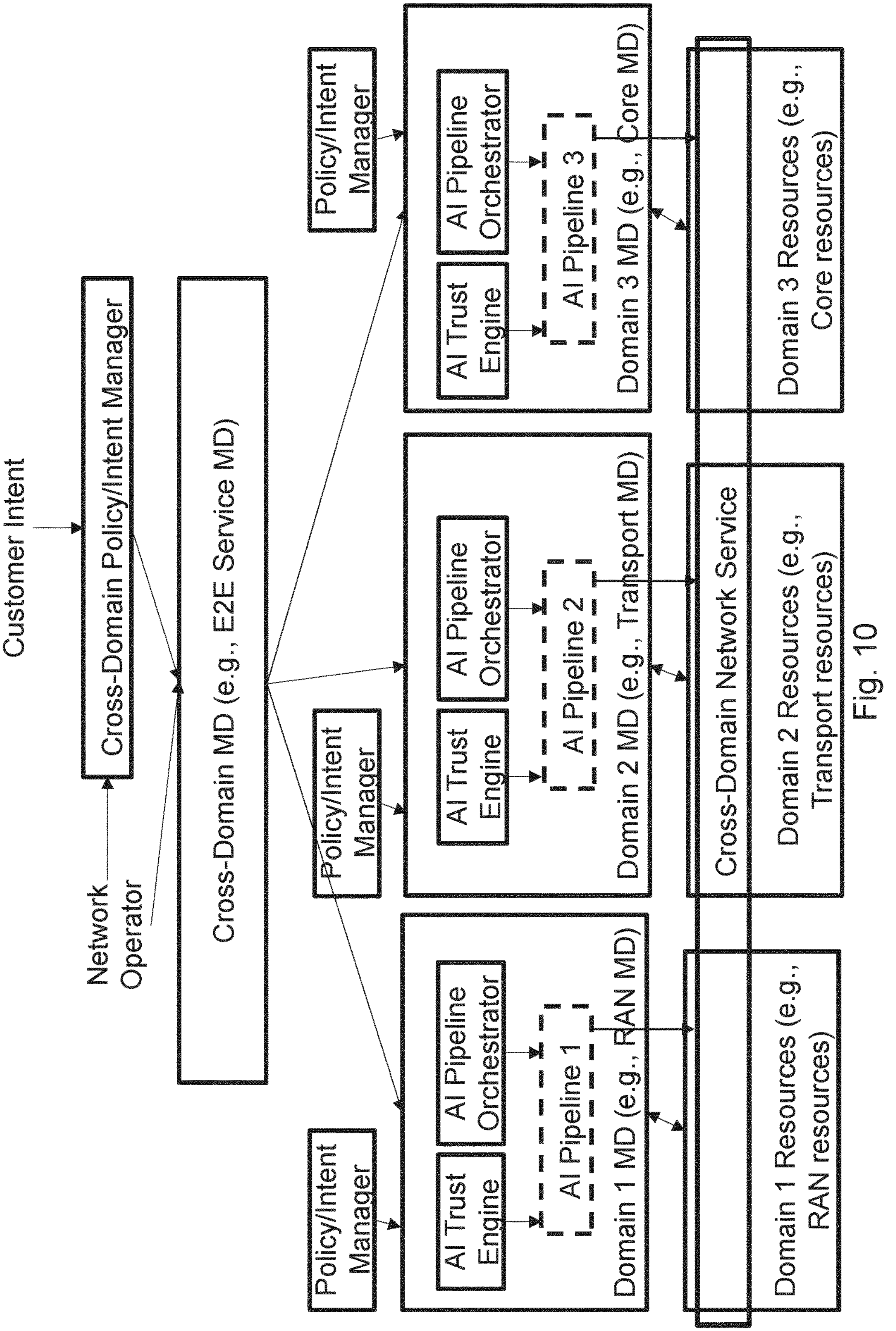
FIG. 10 shows a schematic diagram of an example of a system environment with interfaces and signaling variants according to example embodiments.

FIG. 10 shows a schematic diagram of an example of a system environment with interfaces and signaling variants according to example embodiments, and in particular illustrates a cross-domain management and orchestration architecture leveraging a (the) domain-specific TAI framework.

Example embodiments are outlined considering such cross-domain management and orchestration architecture as shown in FIG. 10. It is noted that a cross-domain end-to-end (E2E) network service scenario is utilized here as an example use case. However, example embodiments are not limited to this example use case. Instead, other cross-domain non-E2E scenarios (i.e., within each domain) are possible, e.g., a core domain can recursively embed 3GPP defined network function (NF) domain and virtualization domain, a radio access network (RAN) domain can include centralized unit (CU), distributed unit (DU), remote radio unit (RRU), midhaul and fronthaul domains provided by different vendors.

In the illustrates cross-domain E2E network service example scenario, the cross-domain service management domain (CDSMD) (e.g., E2E service management domain) is responsible for decomposing the cross-domain E2E network service request (as per the service level agreement (SLA)), received from the network operator or the customer (via cross-domain policy/intent manager), into domain-specific (e.g., RAN, transport, core) network resource/service requirements, and for communicating them to the corresponding individual management domains (MD). Then, the individual MDs are responsible for ensuring that the domain-specific resource/service requirements are fulfilled, within their corresponding domains, by continuously monitoring the resource/service related key performance indicators (KPI) and reporting them to the CDSMD.

In the illustrated cross-domain E2E network service example scenario, the requested/instantiated cross-domain E2E network service, e.g. covering RAN, transport and core domains, may be managed by their corresponding AI pipelines (or cognitive network functions (CNF)) in the respective MDs. It is to be noted that, depending on the use case, the AI pipeline may be instantiated either in the domain-specific MDs (e.g., for proactive resource autoscaling) or within the domain itself (e.g., for proactive mobility handover in RAN domain).

Leveraging the domain-specific AI pipeline orchestrator and the AI pipeline-specific AI performance manager of the trustworthy AI/ML framework for CANs underlying example embodiments, the AI pipeline performance for the domain-specific AI pipelines may be defined, configured, measured and reported within the corresponding MD.

However, there is no way for the cross-domain AI pipeline orchestrator (within the CDSMD) to receive the desired cross-domain AI QoS (i.e., defined by the cross-domain policy/intent manager).

Consequently, there is no way for the CDSMD to
- translate the cross-domain AI QoS into domain-specific AI QoS,
- discover the AI performance capability information from the domain-specific AI pipeline orchestrator(s),
- communicate the translated domain-specific AI QoS to the domain-specific AI pipeline orchestrator(s), and to
- collect/request the cross-domain AI performance metrics from the domain-specific AI pipeline orchestrator(s).

In addition thereto, there was no way for the CDSMD to address (e.g., performing root-cause analysis) the AI performance related escalations, belonging to a cross-domain E2E network service, potentially received from the domain-specific AI pipeline orchestrator(s), and there was no way to delegate the relevant AI performance related escalation information potentially received from the domain-specific AI pipeline orchestrator of one MD to another MD so that the other MD may take preventive measures to avoid cross-domain E2E network service SLA violations (in the considered case: cross-domain AI QoS). Moreover, there was also no way for the CDSMD to aggregate the AI performance related escalation metrics potentially received from the AI pipeline orchestrator(s) of individual MDs to provide a global view of an issue (in the considered case: cross-domain AI QoS violations) to the network operator or the customer.

Figure 11:
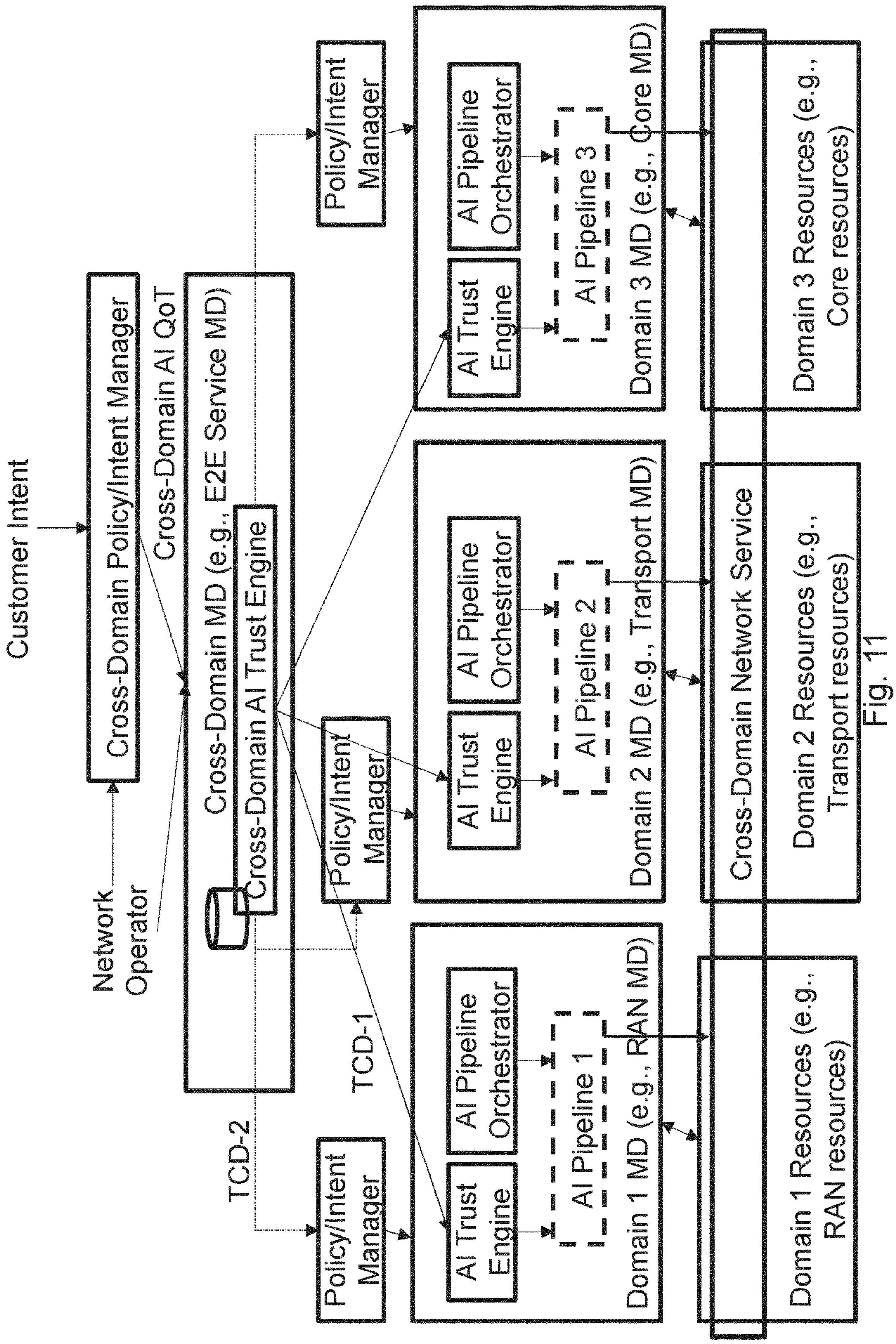
FIG. 11 shows a schematic diagram of an example of a system environment with interfaces and signaling variants according to example embodiments.

FIG. 11 shows a schematic diagram of an example of a system environment with interfaces and signaling variants according to example embodiments, and in particular illustrates a cross-domain management and orchestration architecture with a cross-domain AI trust engine.

Even such cross-domain management and orchestration architecture with a cross-domain AI trust engine (potentially providing cross-domain trust APIs between domain-specific AI trust engine and cross-domain AI trust engine) does not foresee cross-domain performance related APIs between a domain-specific AI pipeline orchestrator and a cross-domain AI pipeline orchestrator.

In view of the above, in brief, according to example embodiments, cross-domain performance related APIs are provided between a domain-specific AI pipeline orchestrator and a cross-domain AI pipeline orchestrator in order to allow for control and evaluation of performance of AI/ML pipelines in cross-domain scenarios in particular for interoperable and multi-vendor environments.

Figure 12:
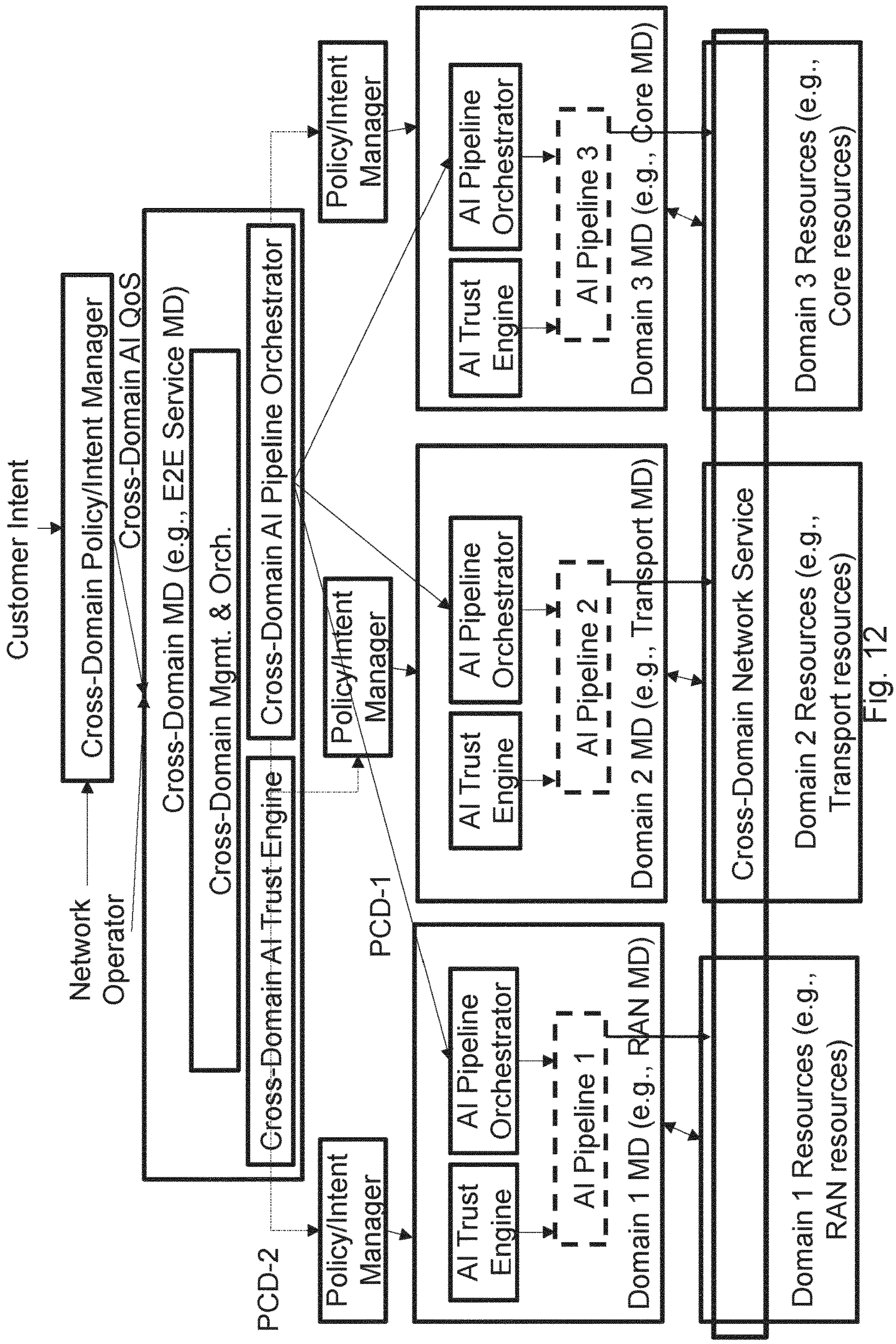
FIG. 12 shows a schematic diagram of an example of a system environment with interfaces and signaling variants according to example embodiments.

FIG. 12 shows a schematic diagram of an example of a system environment with interfaces and signaling variants according to example embodiments, and in particular illustrates a cross-domain management and orchestration architecture with a cross-domain AI pipeline orchestrator.

According to example embodiments, the cross-domain trustworthy AI/ML framework for cognitive autonomous networks underlying example embodiments is extended in order to facilitate the discovery, configuration, monitoring and reporting of cross-domain network service-related AI pipelines performance for interoperable and multi-vendor environments. A customer intent corresponding to a network service may include cross-domain AI QoS requirements in addition to the cross-domain QoT requirements, and the cross-domain TAI framework is used to ensure the fulfilment of desired cross-domain AI QoS requirements.

As shown in FIG. 12, the cross-domain TAI framework according to example embodiments introduces a new interface (named, e.g., PCD-1) that supports interactions between a cross-domain AI pipeline orchestrator and (a) domain-specific AI pipeline orchestrator(s). Alternatively, or in addition, the cross-domain TAI framework according to example embodiments introduces another new interface (named, e.g., PCD-2) between the cross-domain AI pipeline orchestrator and (a) domain-specific policy/intent manager(s) (to support alternative implementation).

According to example embodiments, the cross-domain AI pipeline orchestrator may consequently support the following operations:

- Configuring/delegating the desired/updated AI QoS (derived from the cross-domain AI QoS) that the domain-specific AI pipeline orchestrator is required to meet in the domain-specific AI pipeline belonging to the cross-domain network service,
- Discovering information concerning the performance capabilities (e.g., supported performance metrics, (re) configurable options such as model retraining, model reselection, model termination) of the domain-specific AI pipeline that the AI pipeline orchestrator is capable to configure in the domain-specific AI pipeline belonging to the cross-domain network service,
- Requesting the domain-specific AI pipeline orchestrator to (re)configure (e.g., retrain the model, reselect the model, terminate the model) the domain-specific AI pipeline belonging to the cross-domain network service and/or to configure the AI performance metrics to be measured in the domain-specific AI pipeline belonging to the cross-domain network service,
- Requesting/querying AI performance report for the domain-specific AI pipeline belonging to the cross-domain network service from the domain-specific AI pipeline orchestrator(s),
- Verifying whether the cross-domain AI QoS and/or the domain-specific AI QoS requirements for the cross-domain network service are satisfied,
- Performing root-cause analysis of the AI performance reports received from the domain-specific AI pipeline orchestrator(s); if needed, updating the domain-specific AI QoS requirements based on the AI performance reports,
- Providing a global view of the problem/escalation with respect to the cross-domain network service (e.g., aggregated cross-domain network service-related AI performance report) (in the considered case: cross-domain AI QoS violations) to the network operator, and
- Delegating relevant AI performance escalation-related information received from the domain-specific AI pipeline orchestrator of one MD to another MD so that the other MD may take preventive measures to avoid cross-domain E2E network service SLA violations (in the considered case: cross-domain AI QoS).

To facilitate these functionalities, according to example embodiments, the following cross-domain APIs (produced by domain-specific AI pipeline orchestrator(s) and consumed by cross-domain AI pipeline orchestrator) are provided:

1. Cross-Domain AI Performance Capability Discovery API (Request/Response)—It allows the cross-domain AI pipeline orchestrator (entity), via (e.g.) PCD-1 interface, to discover AI reconfiguration methods and/or AI performance metrics that the domain-specific AI pipeline orchestrator (entity) is capable of configuring in the domain-specific AI pipeline belonging to the cross-domain network service.
2. Cross-Domain AI Performance Configuration API or Cross-Domain AI Performance Delegation API (Request/Response)—It allows the cross-domain AI pipeline orchestrator (entity), via (e.g.) PCD-1 interface, to configure/delegate the desired/updated AI QoS (derived from the cross-domain AI QoS) that the domain-specific AI pipeline orchestrator (entity) is required to meet in the domain-specific AI pipeline belonging to the cross-domain network service. Additionally, it allows the cross-domain AI pipeline orchestrator (entity) to request the domain-specific AI pipeline orchestrator (entity) to (re)configure (e.g., retrain the model, reselect the model, terminate the model) the domain-specific AI pipeline belonging to the cross-domain network service and/or to configure the AI performance metrics to be measured in the domain-specific AI pipeline belonging to the cross-domain network service. Alternatively, it allows the cross-domain AI pipeline orchestrator (entity), via (e.g.) PCD-2 interface, to notify the desired/updated AI QoS (derived from the cross-domain AI QoS) that the domain-specific policy/intent manager (entity) (via domain-specific AI pipeline orchestrator (entity)) is required to configure in the domain-specific AI pipeline belonging to the cross-domain network service.
3. Cross-Domain AI Performance Reporting API or Cross-Domain AI Performance Escalation API (Request/Response or Subscribe/Notify)—It allows the cross-domain AI pipeline orchestrator (entity), via (e.g.) PCD-1 interface, to request/subscribe for AI performance metrics that the domain-specific AI pipeline (entity) orchestrator is capable of measuring/reporting/escalating in the domain-specific AI pipeline belonging to the cross-domain network service.

Example embodiments are specified below in more detail.

Figure 1:
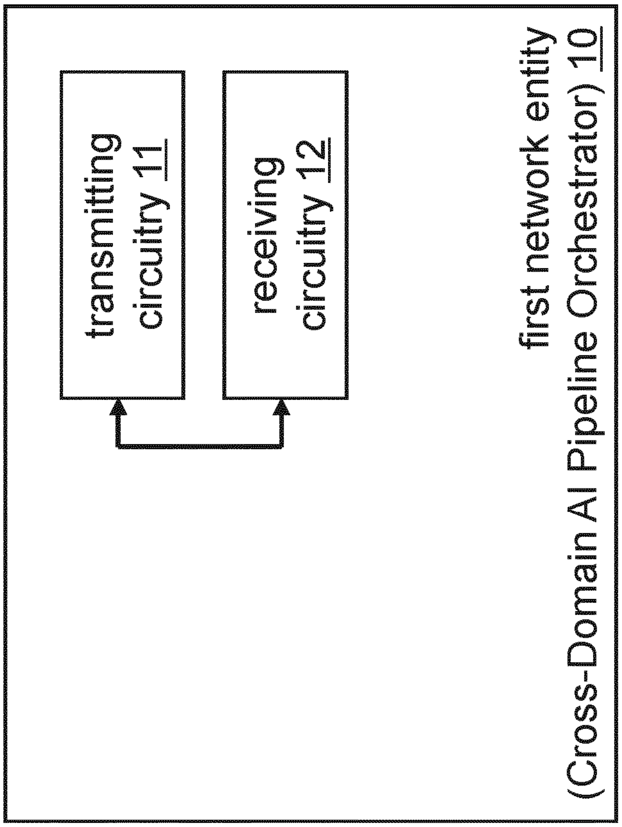
FIG. 1 is a block diagram illustrating an apparatus according to example embodiments.

FIG. 1 is a block diagram illustrating an apparatus according to example embodiments. The apparatus may be a first network node or entity 10 such as a cross-domain artificial intelligence pipeline orchestrator entity (e.g. managing artificial intelligence or machine learning pipelines in a plurality of network domains including a first network domain in a network) comprising a transmitting circuitry 11 and a receiving circuitry 12. The transmitting circuitry 11 transmits a first artificial intelligence or machine learning performance related message towards a second network entity managing lifecycles of artificial intelligence or machine learning pipelines in said first network domain in said network. The receiving circuitry 12 receives a second artificial intelligence or machine learning performance related message from said second network entity. Here, said first artificial intelligence or machine learning performance related message comprises a first information element including at least one first cross-domain network service involved artificial intelligence or machine learning pipeline performance related parameter.

Figure 5:
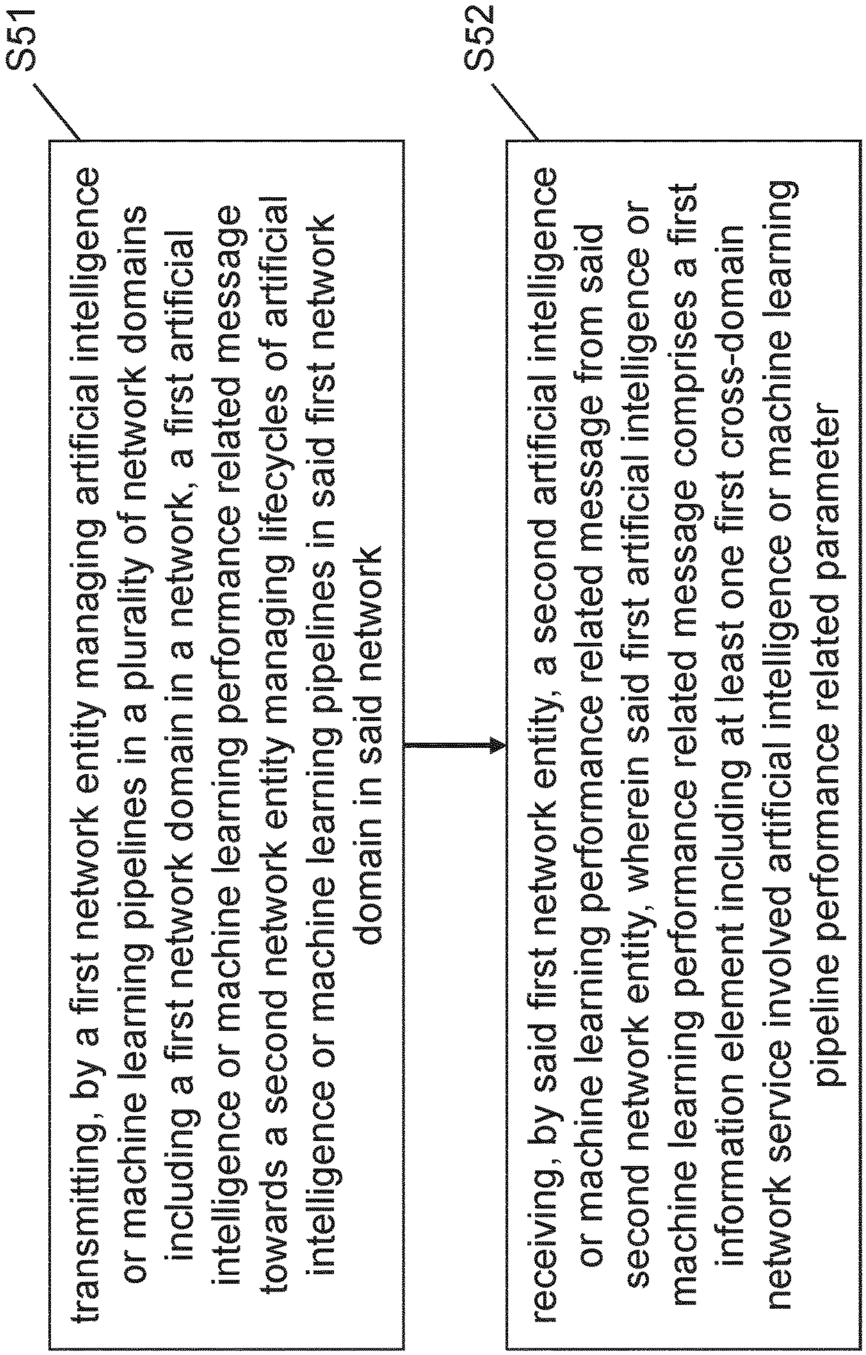
FIG. 5 is a schematic diagram of a procedure according to example embodiments.

FIG. 5 is a schematic diagram of a procedure according to example embodiments. The apparatus according to FIG. 1 may perform the method of FIG. 5 but is not limited to this method. The method of FIG. 5 may be performed by the apparatus of FIG. 1 but is not limited to being performed by this apparatus.

As shown in FIG. 5, a procedure according to example embodiments comprises an operation of transmitting (S51) a first artificial intelligence or machine learning performance related message towards a second network entity managing lifecycles of artificial intelligence or machine learning pipelines in said first network domain in said network, and an operation of receiving (S52) a second artificial intelligence or machine learning performance related message from said second network entity. Here, said first artificial intelligence or machine learning performance related message comprises a first information element including at least one first cross-domain network service involved artificial intelligence or machine learning pipeline performance related parameter.

Figure 2:
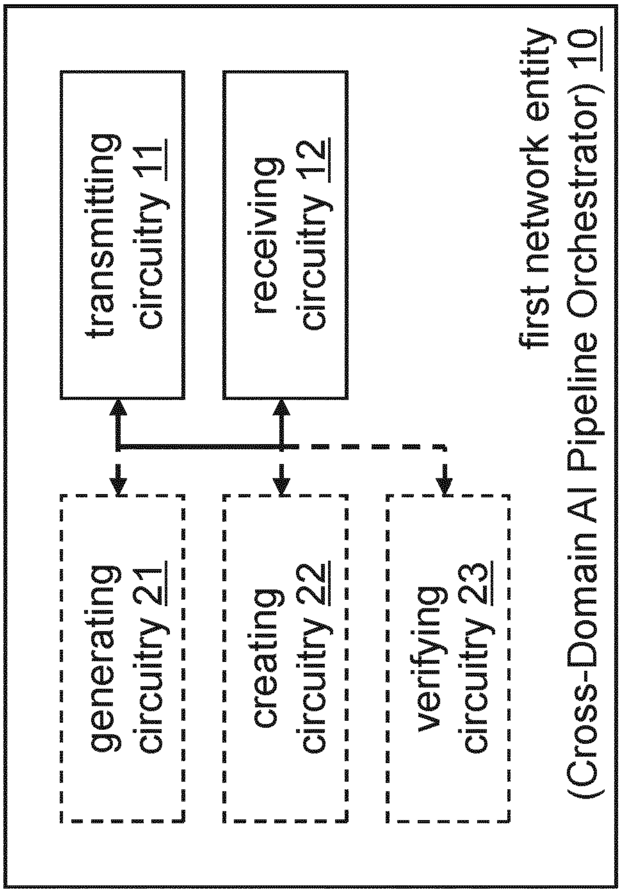
FIG. 2 is a block diagram illustrating an apparatus according to example embodiments.

FIG. 2 is a block diagram illustrating an apparatus according to example embodiments. In particular, FIG. 2 illustrates a variation of the apparatus shown in FIG. 1. The apparatus according to FIG. 2 may thus further comprise a generating circuitry 21, a creating circuitry 22, and/or a verifying circuitry 23.

In an embodiment at least some of the functionalities of the apparatus shown in FIG. 1 (or 2) may be shared between two physically separate devices forming one operational entity. Therefore, the apparatus may be seen to depict the operational entity comprising one or more physically separate devices for executing at least some of the described processes.

According to further example embodiments, said first artificial intelligence or machine learning performance related message is a cross-domain performance capability information request, said second artificial intelligence or machine learning performance related message is a cross-domain performance capability information response, and said second artificial intelligence or machine learning performance related message comprises a second information element including at least one second cross-domain network service involved artificial intelligence or machine learning pipeline performance related parameter.

According to further example embodiments, said at least one first cross-domain network service involved artificial intelligence or machine learning pipeline performance related parameter includes at least one of first domain scope information indicative of said first network domain, first scope information indicative of at least one artificial intelligence or machine learning pipeline in said first network domain to which said cross-domain performance capability information request relates, first phase information indicative of at least one artificial intelligence or machine learning pipeline phase to which said cross-domain performance capability information request relates, and customer information indicative of a customer or a category of said customer for which said at least one artificial intelligence or machine learning pipeline in said first network domain to which said cross-domain performance capability information request relates is to be envisaged.

According to further example embodiments, said at least one second cross-domain network service involved artificial intelligence or machine learning pipeline performance related parameter includes at least one capability information entry, wherein each respective capability information entry of said at least one capability information entry includes at least one of second domain scope information indicative of said first network domain, second scope information indicative of an artificial intelligence or machine learning pipeline in said first network domain to which said respective capability information entry relates, second phase information indicative of at least one artificial intelligence or machine learning pipeline phase to which said respective capability information entry relates, configuration information indicative of at least one configuration option supported for said artificial intelligence or machine learning pipeline to which said respective capability information entry relates, and performance metrics information indicative of at least one performance metric supported for said at least one artificial intelligence or machine learning pipeline phase of said artificial intelligence or machine learning pipeline to which said respective capability information entry relates.

According to a variation of the procedure shown in FIG. 5, exemplary additional operations are given, which are inherently independent from each other as such. According to such variation, an exemplary method according to example embodiments may comprise an operation of receiving cross-domain related artificial intelligence or machine learning quality of service requirements, an operation of generating domain-specific artificial intelligence or machine learning quality of service requirements for said first network domain based on said cross-domain related artificial intelligence or machine learning quality of service requirements, and an operation of creating said at least one first cross-domain network service involved artificial intelligence or machine learning pipeline performance related parameter based on said domain-specific artificial intelligence or machine learning quality of service requirements.

According to a variation of the procedure shown in FIG. 5, exemplary additional operations are given, which are inherently independent from each other as such. According to such variation, an exemplary method according to example embodiments may comprise an operation of verifying, based on content of said second artificial intelligence or machine learning performance related message, whether said cross-domain related artificial intelligence or machine learning quality of service requirements can be satisfied. According to such variation, an exemplary method according to example embodiments may additionally comprise an operation of transmitting, if, as a result of said verifying, said cross-domain related artificial intelligence or machine learning quality of service requirements cannot be satisfied, a cross-domain related artificial intelligence or machine learning quality of service non-acknowledgement message towards a third network entity responsible for fulfillment of network operator specifications in said first network domain in said network.

According to further example embodiments, said first artificial intelligence or machine learning performance related message is a cross-domain performance configuration request, and said second artificial intelligence or machine learning performance related message is a cross-domain performance configuration response.

According to further example embodiments, said at least one first cross-domain network service involved artificial intelligence or machine learning pipeline performance related parameter includes at least one configuration entry, wherein each respective configuration entry of said at least one configuration entry includes at least one of domain scope information indicative of said first network domain, scope information indicative of an artificial intelligence or machine learning pipeline in said first network domain to which said respective configuration entry relates, phase information indicative of at least one artificial intelligence or machine learning pipeline phase to which said respective configuration entry relates, at least one of said domain-specific artificial intelligence or machine learning quality of service requirements, method trigger information indicative of at least one to-be-triggered configurable method of said artificial intelligence or machine learning pipeline to which said respective configuration entry relates, and performance metrics configuration information indicative of at least one to-be-configured performance metric for said at least one artificial intelligence or machine learning pipeline phase of said artificial intelligence or machine learning pipeline to which said respective configuration entry relates.

According to a variation of the procedure shown in FIG. 5, exemplary additional operations are given, which are inherently independent from each other as such. According to such variation, an exemplary method according to example embodiments may comprise an operation of transmitting a third artificial intelligence or machine learning performance related message towards a third network entity responsible for fulfillment of network operator specifications in said first network domain in said network, and an operation of receiving a fourth artificial intelligence or machine learning performance related message from said third network entity. Here, said third artificial intelligence or machine learning performance related message comprises a third information element including at least one third cross-domain network service involved artificial intelligence or machine learning pipeline performance related parameter. Further, said third artificial intelligence or machine learning performance related message is a cross-domain performance configuration request. Still further, said fourth artificial intelligence or machine learning performance related message is a cross-domain performance configuration response.

According to further example embodiments, said at least one third cross-domain network service involved artificial intelligence or machine learning pipeline performance related parameter includes at least one configuration entry, wherein each respective configuration entry of said at least one configuration entry includes at least one of domain scope information indicative of said first network domain, scope information indicative of an artificial intelligence or machine learning pipeline in said first network domain to which said respective configuration entry relates, and at least one of said domain-specific artificial intelligence or machine learning quality of service requirements.

According to further example embodiments, said first artificial intelligence or machine learning performance related message is a cross-domain performance report request, said second artificial intelligence or machine learning performance related message is a cross-domain performance report response, and said second artificial intelligence or machine learning performance related message comprises a second information element including at least one second cross-domain network service involved artificial intelligence or machine learning pipeline performance related parameter.

According to further example embodiments, said at least one first cross-domain network service involved artificial intelligence or machine learning pipeline performance related parameter includes at least one of domain scope information indicative of said first network domain, scope information indicative of an artificial intelligence or machine learning pipeline in said first network domain to which said cross-domain performance report request relates, phase information indicative of at least one artificial intelligence or machine learning pipeline phase to which said cross-domain performance report request relates, a list indicative of performance metrics demanded to be reported, start time information indicative of a begin of a timeframe for which reporting is demanded with said cross-domain performance report request, stop time information indicative of an end of said timeframe for which reporting is demanded with said cross-domain performance report request, and periodicity information indicative of a periodicity interval with which reporting is demanded with said cross-domain performance report request.

According to further example embodiments, said at least one second cross-domain network service involved artificial intelligence or machine learning pipeline performance related parameter includes at least one of demanded performance metrics.

According to further example embodiments, said first artificial intelligence or machine learning performance related message is a cross-domain performance subscription, said second artificial intelligence or machine learning performance related message is a cross-domain performance notification, and said second artificial intelligence or machine learning performance related message comprises a second information element including at least one second cross-domain network service involved artificial intelligence or machine learning pipeline performance related parameter.

According to further example embodiments, said at least one first cross-domain network service involved artificial intelligence or machine learning pipeline performance related parameter includes at least one of domain scope information indicative of said first network domain, scope information indicative of an artificial intelligence or machine learning pipeline in said first network domain to which said cross-domain performance subscription relates, phase information indicative of at least one artificial intelligence or machine learning pipeline phase to which said cross-domain performance subscription relates, a list indicative of performance metrics demanded to be reported, and at least one reporting threshold corresponding to at least one of said performance metrics demanded to be reported.

According to further example embodiments, said at least one second cross-domain network service involved artificial intelligence or machine learning pipeline performance related parameter includes demanded performance metrics.

Figure 3:
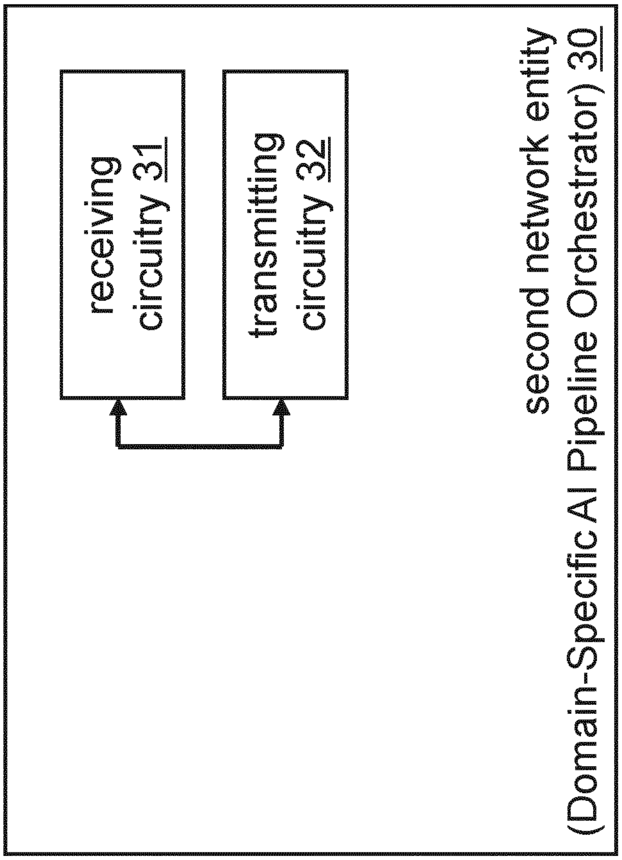
FIG. 3 is a block diagram illustrating an apparatus according to example embodiments.

FIG. 3 is a block diagram illustrating an apparatus according to example embodiments. The apparatus may be a second network node or entity 30 such as a domain-specific artificial intelligence pipeline orchestrator entity (e.g. managing lifecycles of artificial intelligence or machine learning pipelines in a first network domain in a network) comprising a receiving circuitry 31 and a transmitting circuitry 32. The receiving circuitry 31 receives a first artificial intelligence or machine learning performance related message from a first network entity managing artificial intelligence or machine learning pipelines in a plurality of network domains including said first network domain in said network. The transmitting circuitry 32 transmits a second artificial intelligence or machine learning performance related message towards said first network entity. Here, said first artificial intelligence or machine learning performance related message comprises a first information element including at least one first cross-domain network service involved artificial intelligence or machine learning pipeline performance related parameter.

Figure 6:
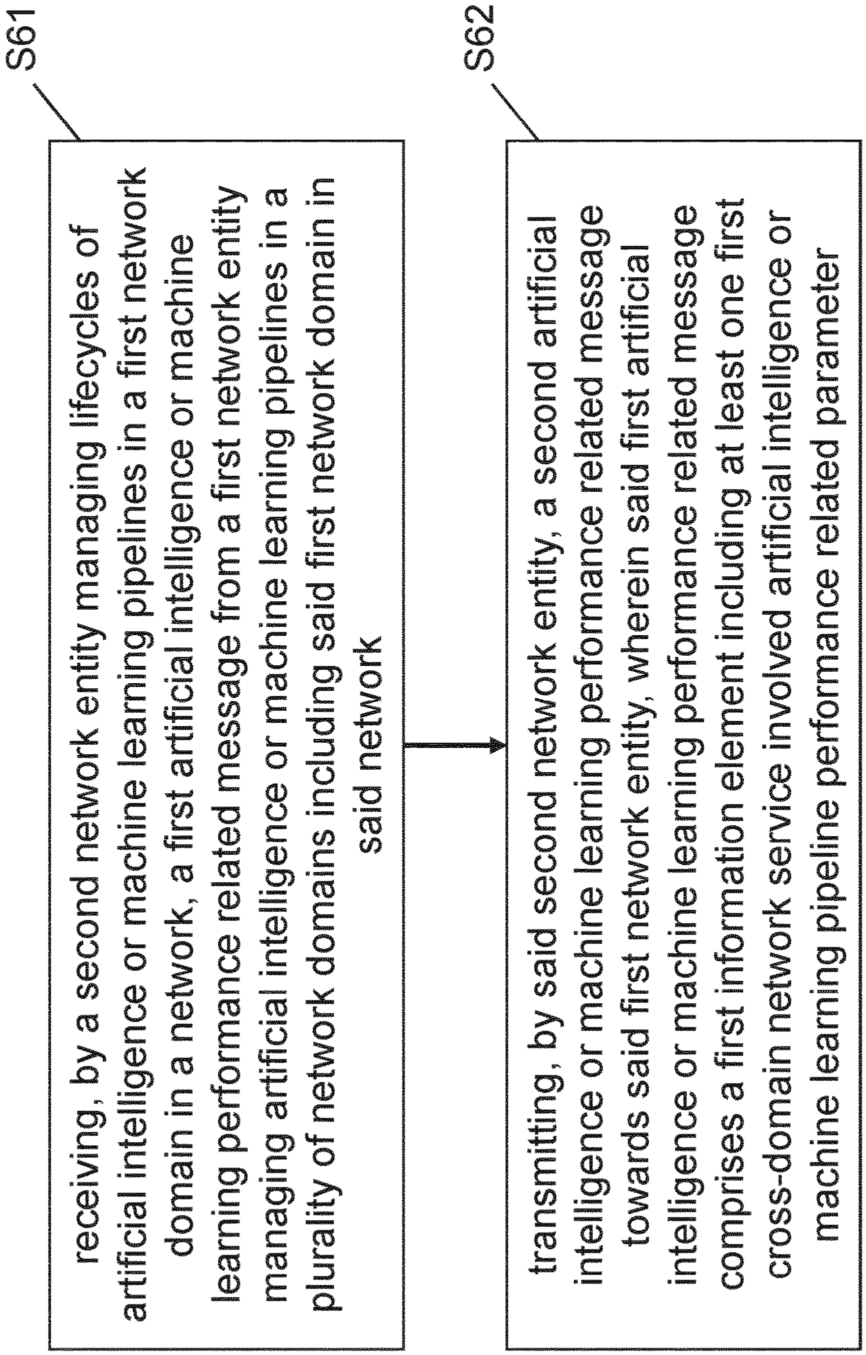
FIG. 6 is a schematic diagram of a procedure according to example embodiments.

FIG. 6 is a schematic diagram of a procedure according to example embodiments. The apparatus according to FIG. 3 may perform the method of FIG. 6 but is not limited to this method. The method of FIG. 6 may be performed by the apparatus of FIG. 3 but is not limited to being performed by this apparatus.

As shown in FIG. 6, a procedure according to example embodiments comprises an operation of receiving (S61) a first artificial intelligence or machine learning performance related message from a first network entity managing artificial intelligence or machine learning pipelines in a plurality of network domains including said first network domain in said network, and an operation of transmitting (S62) a second artificial intelligence or machine learning performance related message towards said first network entity. Here, said first artificial intelligence or machine learning performance related message comprises a first information element including at least one first cross-domain network service involved artificial intelligence or machine learning pipeline performance related parameter.

In an embodiment at least some of the functionalities of the apparatus shown in FIG. 3 may be shared between two physically separate devices forming one operational entity. Therefore, the apparatus may be seen to depict the operational entity comprising one or more physically separate devices for executing at least some of the described processes.

According to further example embodiments, said first artificial intelligence or machine learning performance related message is a cross-domain performance capability information request, said second artificial intelligence or machine learning performance related message is a cross-domain performance capability information response, and said second artificial intelligence or machine learning performance related message comprises a second information element including at least one second cross-domain network service involved artificial intelligence or machine learning pipeline performance related parameter.

According to further example embodiments, said at least one first cross-domain network service involved artificial intelligence or machine learning pipeline performance related parameter includes at least one of first domain scope information indicative of said first network domain, first scope information indicative of at least one artificial intelligence or machine learning pipeline in said first network domain to which said cross-domain performance capability information request relates, first phase information indicative of at least one artificial intelligence or machine learning pipeline phase to which said cross-domain performance capability information request relates, and customer information indicative of a customer or a category of said customer for which said at least one artificial intelligence or machine learning pipeline in said first network domain to which said cross-domain performance capability information request relates is to be envisaged.

According to further example embodiments, said at least one second cross-domain network service involved artificial intelligence or machine learning pipeline performance related parameter includes at least one capability information entry, wherein each respective capability information entry of said at least one capability information entry includes at least one of second domain scope information indicative of said first network domain, second scope information indicative of an artificial intelligence or machine learning pipeline in said first network domain to which said respective capability information entry relates, second phase information indicative of at least one artificial intelligence or machine learning pipeline phase to which said respective capability information entry relates, configuration information indicative of at least one configuration option supported for said artificial intelligence or machine learning pipeline to which said respective capability information entry relates, and performance metrics information indicative of at least one performance metric supported for said at least one artificial intelligence or machine learning pipeline phase of said artificial intelligence or machine learning pipeline to which said respective capability information entry relates.

According to further example embodiments, said first artificial intelligence or machine learning performance related message is a cross-domain performance configuration request, and said second artificial intelligence or machine learning performance related message is a cross-domain performance configuration response.

According to further example embodiments, said at least one first cross-domain network service involved artificial intelligence or machine learning pipeline performance related parameter includes at least one configuration entry, wherein each respective configuration entry of said at least one configuration entry includes at least one of domain scope information indicative of said first network domain, scope information indicative of an artificial intelligence or machine learning pipeline in said first network domain to which said respective configuration entry relates, phase information indicative of at least one artificial intelligence or machine learning pipeline phase to which said respective configuration entry relates, at least one of domain-specific artificial intelligence or machine learning quality of service requirements, method trigger information indicative of at least one to-be-triggered configurable method of said artificial intelligence or machine learning pipeline to which said respective configuration entry relates, and performance metrics configuration information indicative of at least one to-be-configured performance metric for said at least one artificial intelligence or machine learning pipeline phase of said artificial intelligence or machine learning pipeline to which said respective configuration entry relates.

According to further example embodiments, said first artificial intelligence or machine learning performance related message is a cross-domain performance report request, said second artificial intelligence or machine learning performance related message is a cross-domain performance report response, and said second artificial intelligence or machine learning performance related message comprises a second information element including at least one second cross-domain network service involved artificial intelligence or machine learning pipeline performance related parameter.

According to further example embodiments, said at least one first cross-domain network service involved artificial intelligence or machine learning pipeline performance related parameter includes at least one of domain scope information indicative of said first network domain, scope information indicative of an artificial intelligence or machine learning pipeline in said first network domain to which said cross-domain performance report request relates, phase information indicative of at least one artificial intelligence or machine learning pipeline phase to which said cross-domain performance report request relates, a list indicative of performance metrics demanded to be reported, start time information indicative of a begin of a timeframe for which reporting is demanded with said cross-domain performance report request, stop time information indicative of an end of said timeframe for which reporting is demanded with said cross-domain performance report request, and periodicity information indicative of a periodicity interval with which reporting is demanded with said cross-domain performance report request.

According to further example embodiments, said at least one second cross-domain network service involved artificial intelligence or machine learning pipeline performance related parameter includes at least one of demanded performance metrics.

According to further example embodiments, said first artificial intelligence or machine learning performance related message is a cross-domain performance subscription, said second artificial intelligence or machine learning performance related message is a cross-domain performance notification, and said second artificial intelligence or machine learning performance related message comprises a second information element including at least one second cross-domain network service involved artificial intelligence or machine learning pipeline performance related parameter.

According to further example embodiments, said at least one first cross-domain network service involved artificial intelligence or machine learning pipeline performance related parameter includes at least one of domain scope information indicative of said first network domain, scope information indicative of an artificial intelligence or machine learning pipeline in said first network domain to which said cross-domain performance subscription relates, phase information indicative of at least one artificial intelligence or machine learning pipeline phase to which said cross-domain performance subscription relates, a list indicative of performance metrics demanded to be reported, and at least one reporting threshold corresponding to at least one of said performance metrics demanded to be reported.

According to further example embodiments, said at least one second cross-domain network service involved artificial intelligence or machine learning pipeline performance related parameter includes demanded performance metrics.

Figure 4:
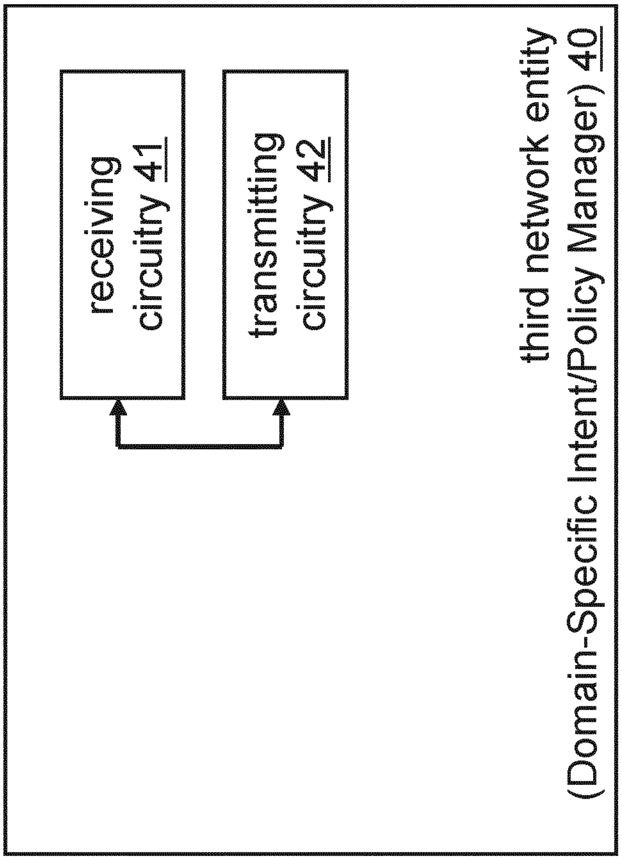
FIG. 4 is a block diagram illustrating an apparatus according to example embodiments.

FIG. 4 is a block diagram illustrating an apparatus according to example embodiments. The apparatus may be a third network node or entity 40 such as a domain-specific intent/policy manager entity (e.g. responsible for fulfillment of network operator specifications in a first network domain in a network) comprising a receiving circuitry 41 and a transmitting circuitry 42. The receiving circuitry 41 receives a third artificial intelligence or machine learning performance related message from a first network entity managing artificial intelligence or machine learning pipelines in a plurality of network domains including said first network domain in said network. The transmitting circuitry 42 transmits a fourth artificial intelligence or machine learning performance related message towards said first network entity. Here, said third artificial intelligence or machine learning performance related message comprises a third information element including at least one third cross-domain network service involved artificial intelligence or machine learning pipeline performance related parameter. Further, said third artificial intelligence or machine learning performance related message is a cross-domain performance configuration request. Still further, said fourth artificial intelligence or machine learning performance related message is a cross-domain performance configuration response.

Figure 7:
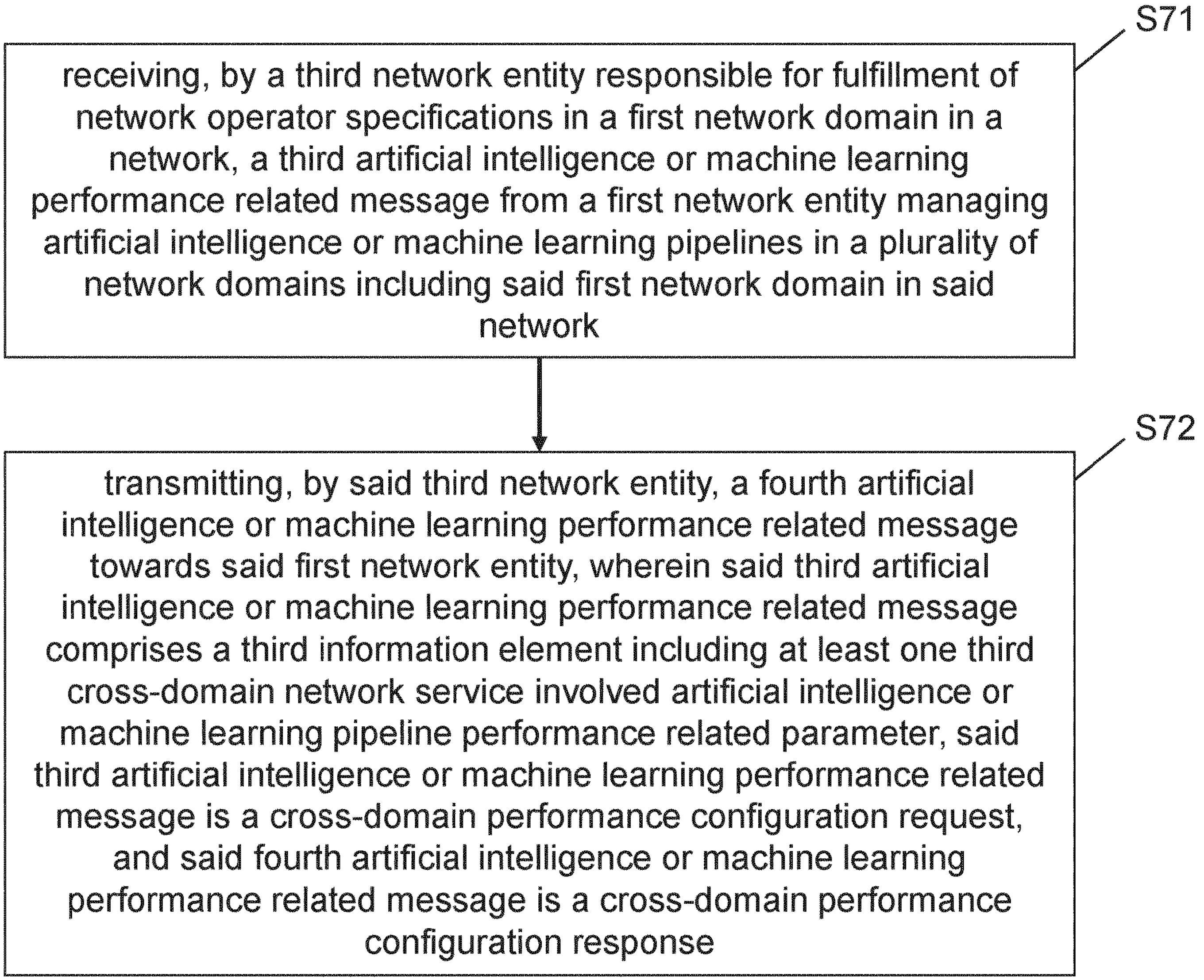
FIG. 7 is a schematic diagram of a procedure according to example embodiments.
Figure 8:
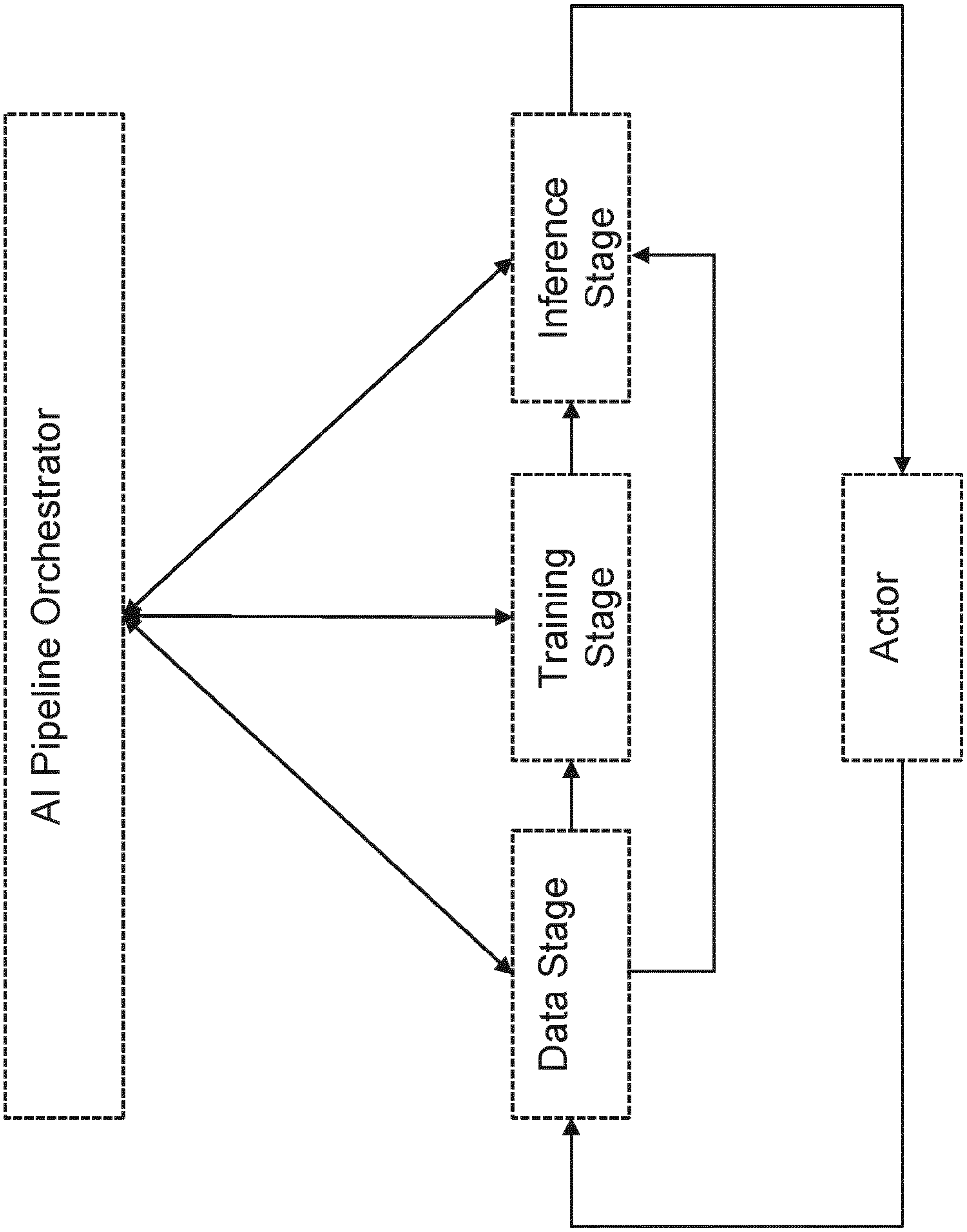
FIG. 8 shows a schematic diagram of an example of an AI/ML pipeline.

FIG. 7 is a schematic diagram of a procedure according to example embodiments. The apparatus according to FIG. 4 may perform the method of FIG. 7 but is not limited to this method. The method of FIG. 7 may be performed by the apparatus of FIG. 4 but is not limited to being performed by this apparatus.

As shown in FIG. 7, a procedure according to example embodiments comprises an operation of receiving (S71) a third artificial intelligence or machine learning performance related message from a first network entity managing artificial intelligence or machine learning pipelines in a plurality of network domains including said first network domain in said network, and an operation of transmitting (S72) a fourth artificial intelligence or machine learning performance related message towards said first network entity. Here, said third artificial intelligence or machine learning performance related message comprises a third information element including at least one third cross-domain network service involved artificial intelligence or machine learning pipeline performance related parameter. Further, said third artificial intelligence or machine learning performance related message is a cross-domain performance configuration request. Still further, said fourth artificial intelligence or machine learning performance related message is a cross-domain performance configuration response.

In an embodiment at least some of the functionalities of the apparatus shown in FIG. 4 may be shared between two physically separate devices forming one operational entity. Therefore, the apparatus may be seen to depict the operational entity comprising one or more physically separate devices for executing at least some of the described processes.

According to further example embodiments, said at least one third cross-domain network service involved artificial intelligence or machine learning pipeline performance related parameter includes at least one configuration entry, wherein each respective configuration entry of said at least one configuration entry includes at least one of domain scope information indicative of said first network domain, scope information indicative of an artificial intelligence or machine learning pipeline in said first network domain to which said respective configuration entry relates, and at least one of domain-specific artificial intelligence or machine learning quality of service requirements.

Example embodiments outlined and specified above are explained below in more specific terms.

Figure 13:
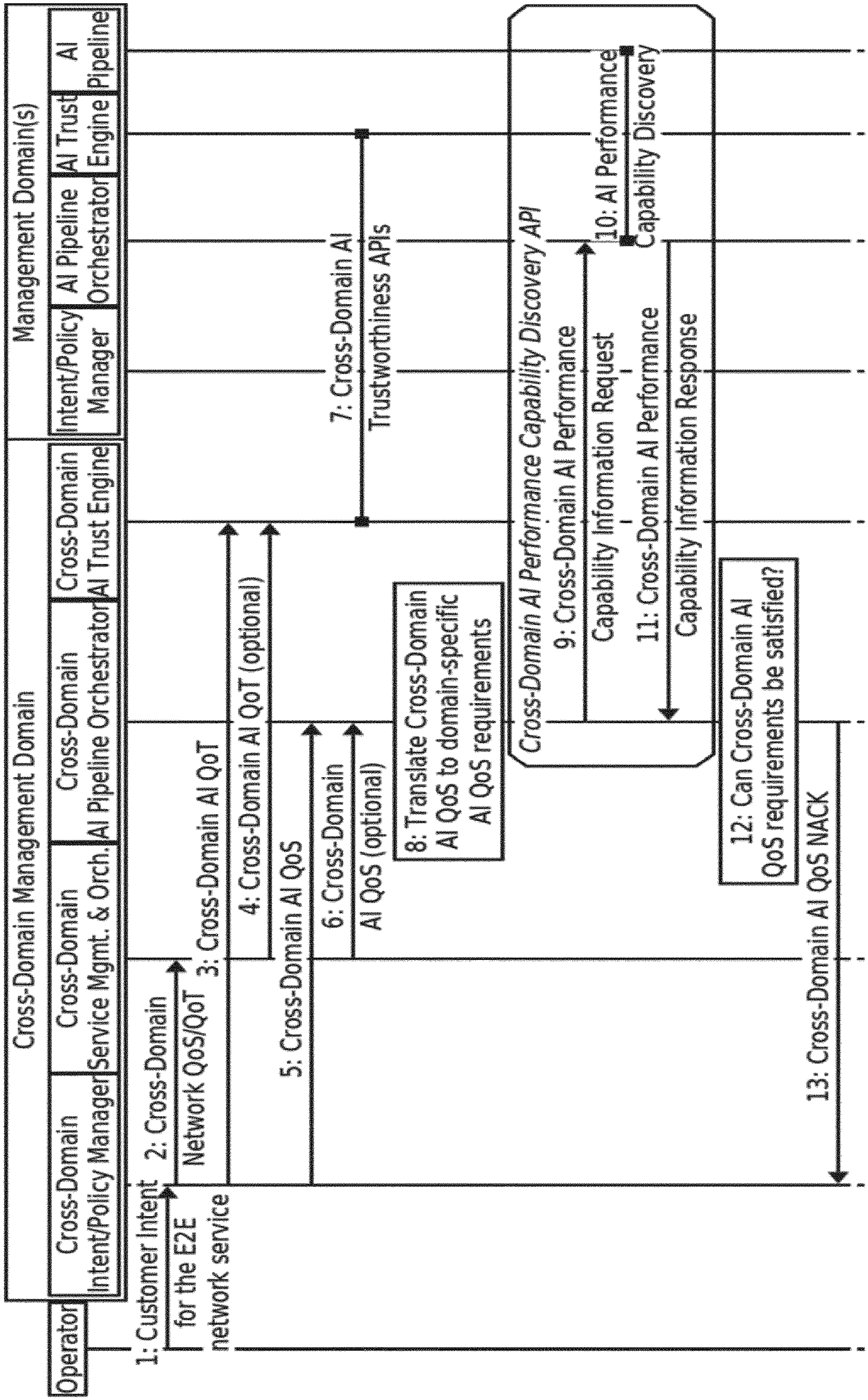
FIG. 13 shows a schematic diagram of signaling sequences according to example embodiments.
Figure 13:
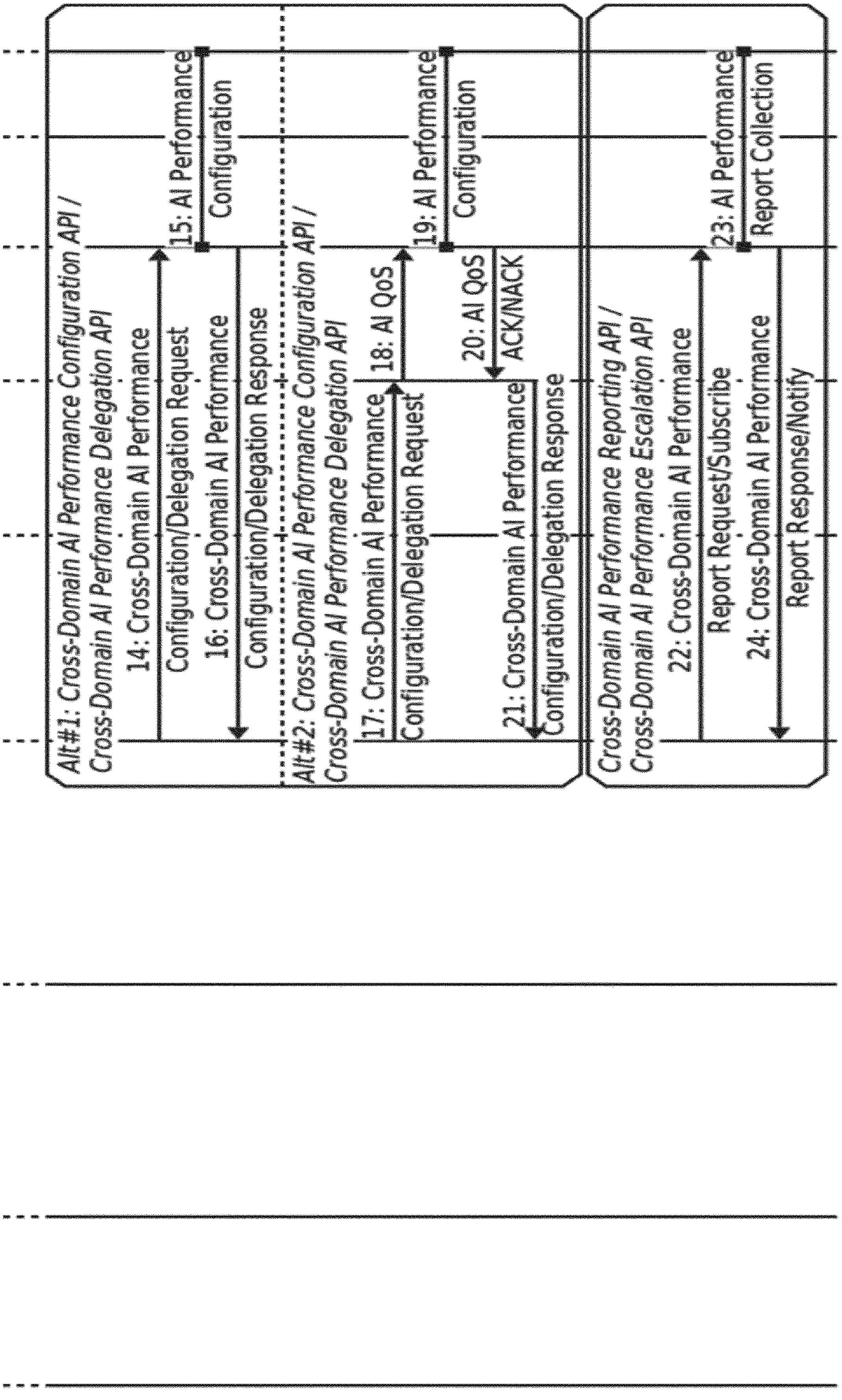

FIG. 13 shows a schematic diagram of signaling sequences according to example embodiments, and in particular illustrates details of the cross-domain AI performance management APIs offered by the AI pipeline orchestrator (entity) to the cross-domain AI pipeline orchestrator (entity).

In FIG. 13, a sequence diagram is shown, illustrating on how the cross-domain AI pipeline orchestrator (entity) can use the new APIs offered by the domain-specific AI pipeline orchestrator(s) (entity/entities) over (e.g.) the PCD-1 interface to discover the performance capabilities of the domain-specific AI pipeline, to (re)configure the domain-specific AI pipeline according to the required AI QoS, and to monitor/collect AI performance metrics from the domain-specific AI pipeline belonging to the cross-domain network service, according to example embodiments. The sequence diagram also illustrates interaction between the cross-domain AI pipeline orchestrator (entity) and the domain-specific policy/intent manager (entity), over (e.g.) the PCD-2 interface, according to example embodiments (representing alternative example embodiments).

In a step 1 of FIG. 13, according to example embodiments, a network operator informs the cross-domain policy/intent manager about the intent for the cross-domain network service.

In steps 2 to 6 of FIG. 13, according to example embodiments, the cross-domain intent/policy manager translates the customer intent into cross-domain network QoS and network QoT (e.g., SLA), cross-domain AI QoS (e.g., accuracy, computational complexity, delay) and cross-domain AI QoT (e.g., explainability) requirements, and sends them to the cross-domain SMO, the cross-domain AI pipeline orchestrator, and the cross-domain AI trust engine, respectively. Alternatively, the cross-domain SMO may translate the cross-domain network QoS and cross-domain network QoT requirements into cross-domain AI QoS and Cross-domain AI QoT requirements and may send them to the cross-domain AI pipeline orchestrator and the cross-domain AI trust engine, respectively.

In a step 7 of FIG. 13, according to example embodiments, the domain-specific AI trust engine exposes AI trustworthiness APIs towards the cross-domain AI trust engine to discover the AI trustworthiness capabilities of the domain-specific AI pipeline, to configure the domain-specific AI pipeline according to the required cross-domain AI QoT, and/or to collect AI trustworthiness metrics or explanations from the domain-specific AI pipeline.

In a step 8 of FIG. 13, according to example embodiments, the cross-domain AI pipeline orchestrator translates the cross-domain AI QoS requirements into domain-specific AI QoS requirements (i.e., RAN domain AI QoS, transport domain AI QoS, and core domain AI QoS) depending on the customer intent of the cross-domain network service. The translation/mapping logic may take into account the SLA requirements (e.g., service type, service priority, KPI metrics) for the cross-domain network service, and, optionally, also the domain-specific AI performance capability information (i.e., in such case, according to example embodiments, the translation may be even performed after steps 9 to 11 of Figure).

Steps 9 to 13 of FIG. 13 particularly illustrate the Cross-domain AI Performance Capability Discovery API according to example embodiments.

In a step 9 of FIG. 13, according to example embodiments, the cross-domain AI pipeline orchestrator sends the Cross-Domain AI Performance Capability Information Request to the domain-specific AI pipeline orchestrator requesting information concerning the performance capabilities (e.g., supported performance metrics, (re)configurable options such as model retraining, model reselection, model termination) of the domain-specific AI pipeline(s) in data stage and/or training stage and/or inference stage. The Cross-Domain AI Performance Capability Information Request may consist of parameters illustrated in the following table exemplifying content of a Cross-domain AI Performance Capability Information Request according to example embodiments.

| Parameter | Mandatory/ Optional | Description |
|---|---|---|
| Domain Scope | Mandatory | Which domain (e.g., RAN, transport, core) the Cross-Domain AI performance capability information is requested for. |
| >AI Pipeline Scope | Mandatory | Which domain-specific AI pipeline(s) the performance capability information is requested for. For e.g., all AI pipelines deployed within the specified network entity, all AI pipelines deployed in the specified network domain. Note: If the AI pipeline ID(s) is already known, then this parameter is not applicable. |
| >AI Pipeline ID | Mandatory | Which domain-specific AI pipeline(s) the performance capability information is requested for. Note: If the AI pipeline ID(s) is not known, then this parameter is not applicable. |
| >Customer category | Optional | Indicates the customer or the customer category based on which the domain-specific AI Pipeline Orchestrator may expose suitable/relevant information since each customer may have different configured (exposure) policies and agreements with the vendor. |
| >>AI Pipeline Phase | Optional | Which phase (data, training, inference) of the domain-specific AI pipeline the performance capability information is requested for. The default is for all stages. |

In a step 10 of FIG. 13, according to example embodiments, the domain-specific AI pipeline orchestrator(s) determines all the information requested in the Cross-Domain AI Performance Capability Information Request by interacting with the AI performance manager of domain-specific AI pipelines belonging to the cross-domain network service.

In a step 11 of FIG. 13, according to example embodiments, the domain-specific AI pipeline orchestrator sends the Cross-Domain AI Performance Capability Information Response consisting of all the information about the domain-specific AI pipeline(s) (belonging to the cross-domain network service) on the supported performance capabilities (e.g., supported performance metrics, (re)configurable options such as model retraining, model reselection, model termination) to the cross-domain AI pipeline orchestrator. The Cross-Domain AI Performance Capability Information Response may consist of parameters illustrated in the following table exemplifying content of a Cross-Domain AI Performance Capability Information Response according to example embodiments.

| Parameter | Mandatory/ Optional | Description |
|---|---|---|
| Domain Scope | Mandatory | Which domain (e.g., RAN, transport, core) the Cross-Domain AI performance capability information is valid for. |
| >AI Pipeline ID | Mandatory | Which domain-specific AI Pipeline(s) the performance capability information is valid for. |
| >>Version ID | Optional | Which version of the domain-specific AI pipeline the performance capability information is valid for. |
| >>Supported (Re)Configurable Options | Mandatory | Which AI pipeline (re)configurable options are supported in the domain-specific AI pipeline based on the reported AI performance metrics. For e.g., retrain the model, reselect a different version of the model, terminate the model. |
| >>AI Pipeline Phase | Optional | Which phase (data, training, inference) of the domain-specific AI pipeline the performance capability information is valid for. |
| >>>Supported AI Performance Metrics | Mandatory | Which AI performance metrics are supported in a particular phase of the domain-specific AI pipeline. For e.g., training/inference data statistics in the data stage, accuracy/precision/recall/F1-score/MSE/MAE / confusion matrix in the training stage, confidence in the inference stage. |
| Additional Information | Optional | Freetext description of the domain-specific AI Pipeline for which the performance capability information is requested. For example:<br>provide information on training/inference data statistics.<br>provide information on the pre-processing operations performed on the data.<br>provide information on the other available versions of the domain-specific AI pipeline.<br>provide information on the number of domain-specific AI pipeline replicasets (if applicable)<br>provide contextual information about the domain-specific AI pipeline (e.g., operating in real-time) |

In steps 12 and 13 of FIG. 13, according to example embodiments, based on the Cross-Domain AI Performance Capability Information Response, the cross-domain AI pipeline orchestrator may determine whether the cross-domain AI QoS is satisfiable. If not satisfiable, the cross-domain AI pipeline orchestrator may send a cross-domain AI QoS non-acknowledgement (NACK) to the cross-domain intent/policy manager.

Steps 14 to 21 of FIG. 13 particularly illustrate the Cross-Domain AI Performance Configuration API or Cross-Domain AI Performance Delegation API according to example embodiments.

Here, steps 14 to 16 of FIG. 13 illustrate the Cross-Domain AI Performance Configuration API or Cross-Domain AI Performance Delegation API according to a first alternative of example embodiments. Further, steps 17 to 21 of FIG. 13 illustrate the Cross-Domain AI Performance Configuration API or Cross-Domain AI Performance Delegation API according to a second alternative of example embodiments.

In a step 14 of FIG. 13, according to example embodiments, the cross-domain AI pipeline orchestrator sends the Cross-Domain AI Performance Configuration/Delegation Request to the domain-specific AI pipeline orchestrator(s) for (re)configuring appropriate methods/options on the domain-specific AI pipeline belonging to the cross-domain network service and/or (re)configuring AI performance metrics to be measured from the domain-specific AI pipeline belonging to the cross-domain network service. Additionally, the Cross-Domain AI Performance Configuration/Delegation Request may also include information on the translated domain-specific AI QoS required to be met in the domain-specific AI pipeline belonging to the cross-domain network service. The Cross-Domain AI Performance Configuration/Delegation Request may consist of parameters illustrated in the following table exemplifying content of a Cross-Domain AI Performance Configuration Request according to example embodiments.

| Parameter | Mandatory/ Optional | Description |
|---|---|---|
| Domain Scope | Mandatory | Which domain (e.g., RAN, transport, core) the Cross-Domain AI performance configuration is requested for. |
| >AI Pipeline ID | Mandatory | Which domain-specific AI Pipeline(s) the performance configuration is requested for. |
| >>Version ID | Optional | Which version of the domain-specific AI pipeline the performance configuration is requested for. |
| >>AI QoS | Mandatory | What is the desired AI QoS for the domain-specific AI pipeline. |
| >>(Re)Configurable Method | Mandatory | Which domain-specific AI pipeline (re)configurable method need to be triggered based on the reported AI performance metrics. For e.g., retrain the model. |
| >>AI Pipeline Phase | Optional | Which phase (data, training, inference) of the domain-specific AI pipeline the performance configuration is valid for. |
| >>>AI Performance Metrics | Mandatory | Which AI performance metrics need to be configured in a particular phase of the domain-specific AI pipeline. For e.g., accuracy in the training stage. |
| Other Configurations | Optional | Which other AI pipeline configurations are requested for based on the 'additional information' reported in Cross-Domain AI Performance Capabilty Information Response. |

In a step 15 of FIG. 13, according to example embodiments, based on the Cross-Domain AI Performance Configuration/Delegation Request, the domain-specific AI pipeline orchestrator may configure the requested (i.e., based on the desired domain-specific AI QoS) methods/options on the domain-specific AI pipeline and/or may configure the AI performance metrics in the domain-specific AI pipeline belonging to the cross-domain network service by interacting with the AI performance manager of the domain-specific AI pipeline.

In a step 16 of FIG. 13, according to example embodiments, depending on whether the configuration process in the previous step was successful or not, the domain-specific AI pipeline orchestrator responds to the cross-domain AI pipeline orchestrator the with Cross-Domain AI Performance Configuration/Delegation Response containing an ACK/NACK (ACK: acknowledgement; NOACK: non-acknowledgement) for satisfying the domain-specific AI QoS in the domain-specific AI pipeline belonging to the cross-domain network service.

As mentioned above, steps 17 to 21 of FIG. 13 illustrate the Cross-Domain AI Performance Configuration API or Cross-Domain AI Performance Delegation API according to a second alternative of example embodiments alternatively to example embodiments explained with reference to steps 14 to 16 of FIG. 13.

In a step 17 of FIG. 13, according to example embodiments, a Cross-Domain AI Performance Configuration/Delegation Request is sent from the cross-domain AI pipeline orchestrator to the domain-specific intent/policy manager to notify about the translated domain-specific AI QoS required to be met in the domain-specific AI pipeline belonging to the cross-domain network service. The Cross-Domain AI Performance Configuration/Delegation Request may consist of parameters illustrated in the following table exemplifying content of a Cross-Domain AI Performance Configuration/Delegation Request according to example embodiments.

| Parameter | Mandatory/ Optional | Description |
|---|---|---|
| Domain Scope | Mandatory | Which domain (e.g., RAN, transport, core) the Cross-Domain AI performance configuration is requested for. |
| >AI Pipeline ID | Mandatory | Which domain-specific AI pipeline the AI performance configuration is requested for. |
| >>AI QoS | Mandatory | What is the desired AI QoS for the domain-specific AI pipeline. |

In a step 18 of FIG. 13, according to example embodiments, the domain-specific intent/policy manager sends the desired AI QoS information to the domain-specific AI pipeline orchestrator.

In a step 19 of FIG. 13, according to example embodiments, based on the Cross-Domain AI Performance Configuration/Delegation Request, the domain-specific AI pipeline orchestrator may determine (i.e., based on the desired domain-specific AI QoS) and (re)configure suitable methods/options on the domain-specific AI pipeline and/or may configure the AI performance metrics in the domain-specific AI pipeline belonging to the cross-domain network service by interacting with the AI performance manager of the domain-specific AI pipeline.

In a step 20 of FIG. 13, according to example embodiments, the domain-specific AI pipeline orchestrator sends the ACK/NACK for satisfying the desired AI QoS in the domain-specific AI pipeline belonging to the cross-domain network service to the domain-specific intent/policy manager.

In a step 21 of FIG. 13, according to example embodiments, depending on whether the domain-specific AI QoS was satisfied or not, the domain-specific intent/policy manager responds to the cross-domain AI pipeline orchestrator with the Cross-Domain AI Performance Configuration/Delegation Response containing an ACK/NACK for satisfying the domain-specific AI QoS in the domain-specific AI pipeline belonging to the cross-domain network service.

Steps 22 to 24 of FIG. 13 particularly illustrate the Cross-Domain AI Performance Reporting API or Cross-Domain AI Escalation API according to example embodiments.

In a step 22 of FIG. 13, according to example embodiments, the cross-domain AI pipeline orchestrator sends the Cross-Domain AI Performance Report Request to the domain-specific AI pipeline orchestrator containing the reporting configuration. The Cross-Domain AI Performance Report Request may consist of parameters illustrated in the following table exemplifying content of a Cross-Domain AI Performance Report Request according to example embodiments.

| Parameter | Mandatory/ Optional | Description |
|---|---|---|
| Domain Scope | Mandatory | Which domain (e.g., RAN, transport, core) the Cross-Domain AI performance report is requested for. |
| AI Pipeline ID | Mandatory | Which domain-specific AI pipeline the AI performance report is requested for. |
| >AI Pipeline Phase | Optional | Which phase (data, training, inference) of the domain-specific AI pipeline the AI performance report is requested for. |
| >>List of AI Performance metrics | Mandatory | Which AI performance metrics need to be reported. |
| >>Start Time | Optional | If Report Type is periodic, what is the start time for reporting. |
| >>End Time | Optional | If Report Type is periodic, what is the end time for reporting. |
| >>Report Interval | Optional | If the Report Type is periodic, then what is the periodicity interval for reporting the AI performance metrics. |

Alternatively, in the step 22 of FIG. 13, according to example embodiments, the cross-domain AI pipeline orchestrator may subscribe to notifications/reports from the domain-specific AI pipeline orchestrator (i.e., Subscribe-Notify model) via a Cross-Domain AI Performance Report Subscribe message. The Cross-Domain AI Performance Report Subscribe may consist of parameters illustrated in the following table exemplifying content of a Cross-Domain AI Performance Report Subscribe according to example embodiments.

| Parameter | Mandatory/ Optional | Description |
|---|---|---|
| Domain Scope | Mandatory | Which domain (e.g., RAN, transport, core) the Cross-Domain AI performance report is requested for. |
| AI Pipeline ID | Mandatory | Which domain-specific AI pipeline the AI performance report is requested for. |
| >AI Pipeline Phase | Optional | Which phase (data, training, inference) of the domain-specific AI pipeline the AI performance report is requested for. |
| >>Applicable AI performance metrics | Mandatory | Which AI performance metrics need to be reported. |
| >>Crossed Reporting Threshold(s) | Mandatory | If a particular performance metric exceeded the reporting threshold, then report the AI performance metrics. |
| Other Subscriptions | Optional | If a new version of the AI pipeline becomes available, then notify the version ID of the new AI pipeline. |

In a step 23 of FIG. 13, according to example embodiments, the domain-specific AI pipeline orchestrator(s) collects all relevant performance metrics specified in the Cross-Domain AI Performance Report Request or Cross-Domain AI Performance Report Subscribe by interacting with the AI performance manager of domain-specific AI pipelines belonging to the cross-domain network service.

In a step 24 of FIG. 13, supposing that one or more reporting characteristics (i.e., periodic or on-demand) is met, in that case, according to example embodiments, the domain-specific AI pipeline orchestrator sends the Cross-Domain AI Performance Report Response to the cross-domain AI pipeline orchestrator as per the reporting configuration specified in the Cross-Domain AI Performance Report Request.

Alternatively, in the step 24 of FIG. 13, supposing that one or more reporting thresholds are met for the applicable AI performance metrics, in that case, according to example embodiments, the domain-specific AI pipeline orchestrator sends the Cross-Domain AI Performance Report Notify message to the cross-domain AI pipeline orchestrator consisting of the actual AI performance reports.

The above-described procedures and functions may be implemented by respective functional elements, processors, or the like, as described below.

In the foregoing exemplary description of the network entity, only the units that are relevant for understanding the principles of the disclosure have been described using functional blocks. The network entity may comprise further units that are necessary for its respective operation. However, a description of these units is omitted in this specification. The arrangement of the functional blocks of the devices is not construed to limit the disclosure, and the functions may be performed by one block or further split into sub-blocks.

When in the foregoing description it is stated that the apparatus, i.e. network node or entity (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 14:
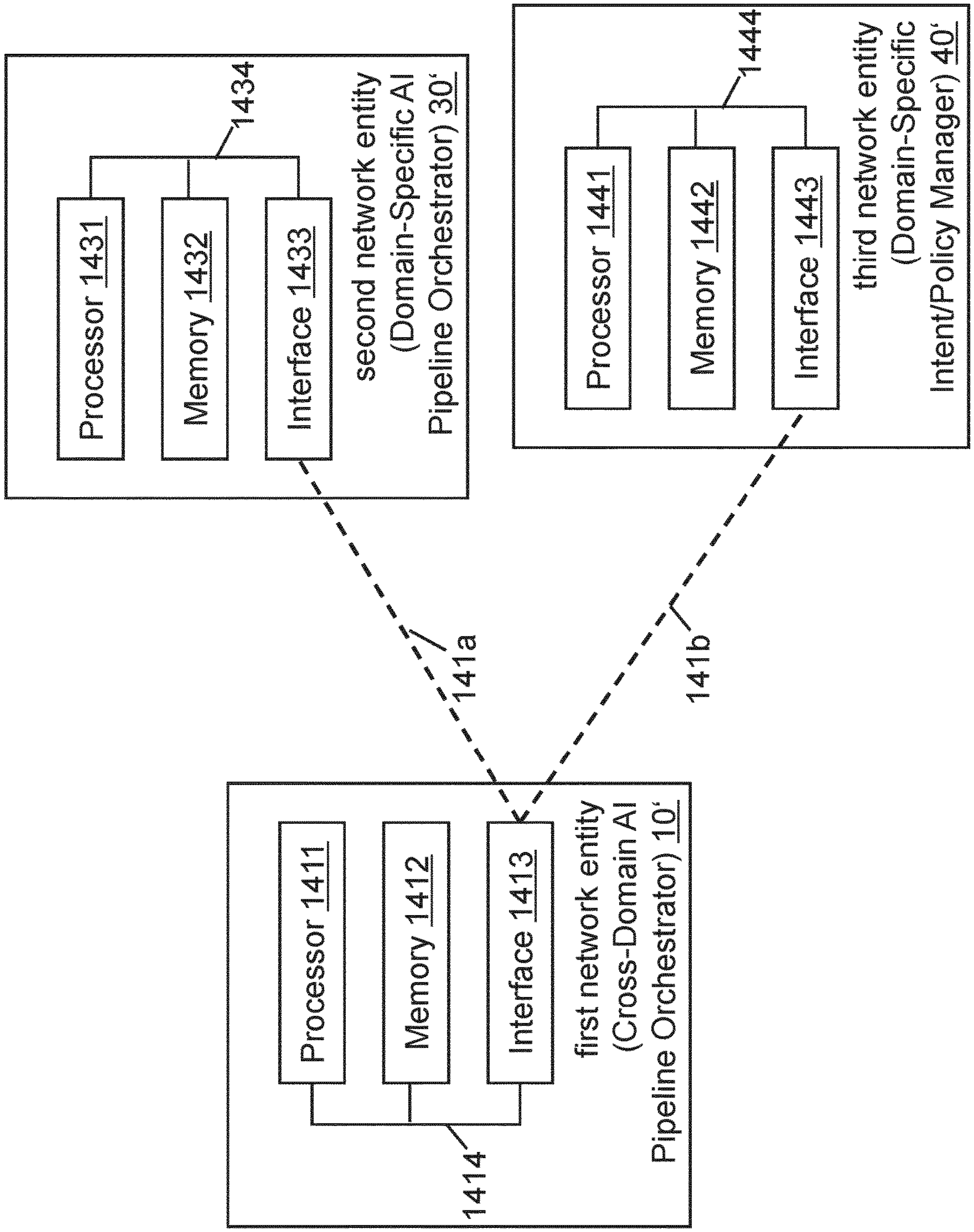
FIG. 14 is a block diagram alternatively illustrating apparatuses according to example embodiments.

In FIG. 14, an alternative illustration of apparatuses according to example embodiments is depicted. As indicated in FIG. 14, according to example embodiments, the apparatus (first network entity) 10' (corresponding to the first network entity 10) comprises a processor 1411, a memory 1412 and an interface 1413, which are connected by a bus 1414 or the like. Further, according to example embodiments, the apparatus (second network entity) 30' (corresponding to the second network entity 30) comprises a processor 1431, a memory 1432 and an interface 1433, which are connected by a bus 1434 or the like. Further, according to example embodiments, the apparatus (third network entity) 40' (corresponding to the third network entity 40) comprises a processor 1441, a memory 1442 and an interface 1443, which are connected by a bus 1444 or the like. The apparatuses may be connected via link 141*a*, 141*b*, respectively.

The processor 1411/1431/1441 and/or the interface 1413/1433/1443 may also include a modem or the like to facilitate communication over a (hardwire or wireless) link, respectively. The interface 1413/1433/1443 may include a suitable transceiver coupled to one or more antennas or communication means for (hardwire or wireless) communications with the linked or connected device(s), respectively. The interface 1413/1433/1443 is generally configured to communicate with at least one other apparatus, i.e. the interface thereof.

The memory 1412/1432/1442 may store respective programs assumed to include program instructions or computer program code that, when executed by the respective processor, enables the respective electronic device or apparatus to operate in accordance with the example embodiments.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to example embodiments, an apparatus representing the network node or entity 10 (e.g. managing artificial intelligence or machine learning pipelines in a plurality of network domains including a first network domain in a network) comprises at least one processor 1411, at least one memory 1412 including computer program code, and at least one interface 1413 configured for communication with at least another apparatus. The processor (i.e. the at least one processor 1411, with the at least one memory 1412 and the computer program code) is configured to perform transmitting a first artificial intelligence or machine learning performance related message towards a second network entity managing lifecycles of artificial intelligence or machine learning pipelines in said first network domain in said network (thus the apparatus comprising corresponding means for transmitting), and to perform receiving a second artificial intelligence or machine learning performance related message from said second network entity, wherein said first artificial intelligence or machine learning performance related message comprises a first information element including at least one first cross-domain network service involved artificial intelligence or machine learning pipeline performance related parameter (thus the apparatus comprising corresponding means for receiving).

According to example embodiments, an apparatus representing the network node or entity 30 (e.g. ma managing lifecycles of artificial intelligence or machine learning pipelines in a first network domain in a network) comprises at least one processor 1431, at least one memory 1432 including computer program code, and at least one interface 1433 configured for communication with at least another apparatus. The processor (i.e. the at least one processor 1431, with the at least one memory 1432 and the computer program code) is configured to perform receiving a first artificial intelligence or machine learning performance related message from a first network entity managing artificial intelligence or machine learning pipelines in a plurality of network domains including said first network domain in said network (thus the apparatus comprising corresponding means for receiving), and to perform transmitting a second artificial intelligence or machine learning performance related message towards said first network entity, wherein said first artificial intelligence or machine learning performance related message comprises a first information element including at least one first cross-domain network service involved artificial intelligence or machine learning pipeline performance related parameter (thus the apparatus comprising corresponding means for transmitting).

According to example embodiments, an apparatus representing the network node or entity 40 (e.g. responsible for fulfillment of network operator specifications in a first network domain in a network) comprises at least one processor 1441, at least one memory 1442 including computer program code, and at least one interface 1443 configured for communication with at least another apparatus. The processor (i.e. the at least one processor 1441, with the at least one memory 1442 and the computer program code) is configured to perform receiving a third artificial intelligence or machine learning performance related message from a first network entity managing artificial intelligence or machine learning pipelines in a plurality of network domains including said first network domain in said network (thus the apparatus comprising corresponding means for receiving), and to perform transmitting a fourth artificial intelligence or machine learning performance related message towards said first network entity, wherein said third artificial intelligence or machine learning performance related message comprises a third information element including at least one third cross-domain network service involved artificial intelligence or machine learning pipeline performance related parameter, said third artificial intelligence or machine learning performance related message is a cross-domain performance configuration request, and said fourth artificial intelligence or machine learning performance related message is a cross-domain performance configuration response (thus the apparatus comprising corresponding means for transmitting).

For further details regarding the operability/functionality of the individual apparatuses, reference is made to the above description in connection with any one of FIGS. 1 to 13, respectively.

For the purpose of the present disclosure as described herein above, it should be noted that

- method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;
- generally, any method step is suitable to be implemented as software or by hardware without changing the idea of the embodiments and its modification in terms of the functionality implemented;
- method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;
- devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;
- an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;
- a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present disclosure. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present disclosure also covers any conceivable combination of method steps and operations described above, and any conceivable combination of nodes, apparatuses, modules or elements described above, as long as the above-described concepts of methodology and structural arrangement are applicable.

In view of the above, there are provided measures for performance related management of artificial intelligence or machine learning pipelines in cross-domain scenarios. Such measures exemplarily comprise transmitting a first artificial intelligence or machine learning performance related message towards a second network entity managing lifecycles of artificial intelligence or machine learning pipelines in a first network domain in a network, and receiving a second artificial intelligence or machine learning performance related message from said second network entity, wherein said first artificial intelligence or machine learning performance related message comprises a first information element including at least one first cross-domain network service involved artificial intelligence or machine learning pipeline performance related parameter.

Even though the disclosure is described above with reference to the examples according to the accompanying drawings, it is to be understood that the disclosure is not restricted thereto. Rather, it is apparent to those skilled in the art that the present disclosure can be modified in many ways without departing from the scope of the inventive idea as disclosed herein.

LIST OF ACRONYMS AND ABBREVIATIONS

3GPP Third Generation Partnership Project
ACK acknowledgement
AI artificial intelligence
API application programming interface
AV autonomous vehicle
CAN cognitive autonomous network
CDSMD cross-domain service management domain
CNF cognitive network function
CU centralized unit
DU distributed unit
E2E end-to-end
HLEG High-level Expert Group
IEC International Electrotechnical Commission
ISO International Organization for Standardization
KPI key performance indicator
MANO management and orchestration
MD management domain
ML machine learning
NACK non-acknowledgement
NF network function
QCI QoS class identifier
QoE quality of experience
QoS quality of service
QoT quality of trustworthiness
RAN radio access network
RRU remote radio unit
SLA service level agreement
SMO service management and orchestration
TAI trustworthy AI
TAIF TAI framework

The invention claimed is:

1. An apparatus of a first network entity managing artificial intelligence or machine learning pipelines in a plurality of network domains including a first network domain in a network, the apparatus comprising:

at least one processor;

at least one memory including computer program code; and at least one interface configured for communication with at least another apparatus;

the at least one processor, with the at least one memory and the computer program code, being configured to cause the apparatus to perform:

receiving cross-domain related artificial intelligence or machine learning quality of service (QoS) requirements;

generating domain-specific artificial intelligence or machine learning QoS requirements for the first network domain based on the cross-domain related artificial intelligence or machine learning QoS requirements;

creating at least one first cross-domain network service involved artificial intelligence or machine learning pipeline performance related parameter based on the domain-specific artificial intelligence or machine learning QoS requirements;

transmitting a first artificial intelligence or machine learning performance related message towards a second network entity managing lifecycles of artificial intelligence or machine learning pipelines in the first network domain in the network, wherein the first artificial intelligence or machine learning performance related message is a cross-domain performance capability information request and comprises a first information element including at least one first cross-domain network service involved artificial intelligence or machine learning pipeline performance related parameter, the at least one first parameter including:

first domain scope information indicative of the first network domain, first scope information indicative of at least one artificial intelligence or machine learning pipeline in the first network domain to which the cross-domain performance capability information request relates, first phase information indicative of at least one artificial intelligence or machine learning pipeline phase to which the cross-domain performance capability information request relates, and customer information indicative of a customer for which the at least one artificial intelligence or machine learning pipeline is to be envisaged;

receiving a second artificial intelligence or machine learning performance related message from the second network entity, wherein the second artificial intelligence or machine learning performance related message is a cross-domain performance capability information response and comprises a second information element including at least one capability information entry, each respective capability information entry including:

second domain scope information indicative of the first network domain;

second scope information indicative of an artificial intelligence or machine learning pipeline in the first network domain to which the respective capability information entry relates;

second phase information indicative of at least one artificial intelligence or machine learning pipeline phase to which the respective capability information entry relates;

configuration information indicative of at least one configuration option supported for the artificial intelligence or machine learning pipeline; and performance metrics information indicative of at least one performance metric supported for the at least one artificial intelligence or machine learning pipeline phase;

verifying, based on content of the second artificial intelligence or machine learning performance related message, whether the cross-domain related artificial intelligence or machine learning QoS requirements can be satisfied;

transmitting, if the cross-domain related artificial intelligence or machine learning QoS requirements cannot be satisfied, a cross-domain related artificial intelligence or machine learning QoS non-acknowledgement message towards a third network entity responsible for fulfillment of network operator specifications in the first network domain;

transmitting a third artificial intelligence or machine learning performance related message towards the third network entity, wherein the third artificial intelligence or machine learning performance related message is a cross-domain performance configuration request comprising a third information element including at least one configuration entry, each respective configuration entry including:

domain scope information indicative of the first network domain;

scope information indicative of an artificial intelligence or machine learning pipeline in the first network domain to which the respective configuration entry relates; and the domain-specific artificial intelligence or machine learning QoS requirements; and receiving a fourth artificial intelligence or machine learning performance related message from the third network entity, wherein the fourth artificial intelligence or machine learning performance related message is a cross-domain performance configuration response.

2. The apparatus according to claim 1, wherein generating the domain-specific artificial intelligence or machine learning QoS requirements comprises translating the cross-domain related artificial intelligence or machine learning QoS requirements into domain-specific QoS requirements based on at least one of service type, service priority, and key performance indicator metrics associated with a service level agreement of the cross-domain network service.

3. The apparatus according to claim 2, wherein the cross-domain performance capability information request further specifies that the requested capability information relates to a training phase of the artificial intelligence or machine learning pipeline.

4. The apparatus according to claim 3, wherein the performance metrics information included in each respective capability information entry comprises accuracy, precision, recall, F1-score, mean squared error, mean absolute error, and confusion matrix information supported during the training phase.

5. The apparatus according to claim 4, wherein the configuration information indicative of at least one configuration option supported for the artificial intelligence or machine learning pipeline comprises at least one of model retraining, model reselection, or model termination.

6. The apparatus according to claim 5, wherein verifying whether the cross-domain related artificial intelligence or machine learning QoS requirements can be satisfied comprises comparing the generated domain-specific artificial intelligence or machine learning QoS requirements with the supported performance metrics and configuration options indicated in the received capability information entry.

7. The apparatus according to claim 6, wherein the third artificial intelligence or machine learning performance related message further includes method trigger information indicative of at least one to-be-triggered configurable method of the artificial intelligence or machine learning pipeline to satisfy the domain-specific artificial intelligence or machine learning QoS requirements.

8. The apparatus according to claim 7, wherein the third artificial intelligence or machine learning performance related message further includes performance metrics configuration information indicative of at least one performance metric to be configured for measurement during an inference phase of the artificial intelligence or machine learning pipeline.

9. The apparatus according to claim 8, wherein the at least one interface is configured to communicate with the second network entity and the third network entity via a cross-domain performance interface dedicated to performance capability discovery and configuration delegation between a cross-domain artificial intelligence pipeline orchestrator and domain-specific entities.

10. The apparatus according to claim 9, wherein the apparatus is a cross-domain artificial intelligence pipeline orchestrator configured to manage artificial intelligence or machine learning pipelines across radio access network, transport network, and core network domains within a multi-vendor cognitive autonomous network environment.

11. A method performed by a first network entity managing artificial intelligence or machine learning pipelines in a plurality of network domains including a first network domain in a network, the method comprising:

receiving cross-domain related artificial intelligence or machine learning quality of service (QoS) requirements;

generating domain-specific artificial intelligence or machine learning QoS requirements for the first network domain based on the cross-domain related artificial intelligence or machine learning QoS requirements;

creating at least one first cross-domain network service involved artificial intelligence or machine learning pipeline performance related parameter based on the domain-specific artificial intelligence or machine learning QoS requirements;

transmitting a first artificial intelligence or machine learning performance related message towards a second network entity managing lifecycles of artificial intelligence or machine learning pipelines in the first network domain in the network, wherein the first artificial intelligence or machine learning performance related message is a cross-domain performance capability information request and comprises a first information element including at least one first cross-domain network service involved artificial intelligence or machine learning pipeline performance related parameter, the at least one first parameter including:

first domain scope information indicative of the first network domain, first scope information indicative of at least one artificial intelligence or machine learning pipeline in the first network domain to which the cross-domain performance capability information request relates, first phase information indicative of at least one artificial intelligence or machine learning pipeline phase to which the cross-domain performance capability information request relates, and customer information indicative of a customer for which the at least one artificial intelligence or machine learning pipeline is to be envisaged;

receiving a second artificial intelligence or machine learning performance related message from the second network entity, wherein the second artificial intelligence or machine learning performance related message is a cross-domain performance capability information response and comprises a second information element including at least one capability information entry, each respective capability information entry including:

second domain scope information indicative of the first network domain;

second scope information indicative of an artificial intelligence or machine learning pipeline in the first network domain to which the respective capability information entry relates;

second phase information indicative of at least one artificial intelligence or machine learning pipeline phase to which the respective capability information entry relates;

configuration information indicative of at least one configuration option supported for the artificial intelligence or machine learning pipeline; and performance metrics information indicative of at least one performance metric supported for the at least one artificial intelligence or machine learning pipeline phase;

verifying, based on content of the second artificial intelligence or machine learning performance related message, whether the cross-domain related artificial intelligence or machine learning QoS requirements can be satisfied;

transmitting, if the cross-domain related artificial intelligence or machine learning QoS requirements cannot be satisfied, a cross-domain related artificial intelligence or machine learning QoS non-acknowledgement message towards a third network entity responsible for fulfillment of network operator specifications in the first network domain;

transmitting a third artificial intelligence or machine learning performance related message towards the third network entity, wherein the third artificial intelligence or machine learning performance related message is a cross-domain performance configuration request comprising a third information element including at least one configuration entry, each respective configuration entry including:

domain scope information indicative of the first network domain;

scope information indicative of an artificial intelligence or machine learning pipeline in the first network domain to which the respective configuration entry relates; and the domain-specific artificial intelligence or machine learning QoS requirements; and receiving a fourth artificial intelligence or machine learning performance related message from the third network entity, wherein the fourth artificial intelligence or machine learning performance related message is a cross-domain performance configuration response.

12. The method according to claim 11, wherein generating the domain-specific artificial intelligence or machine learning QoS requirements comprises translating the cross-domain related artificial intelligence or machine learning QoS requirements into domain-specific QoS requirements based on at least one of service type, service priority, and key performance indicator metrics associated with a service level agreement of the cross-domain network service.

13. The method according to claim 12, wherein the cross-domain performance capability information request further specifies that the requested capability information relates to a training phase of the artificial intelligence or machine learning pipeline.

14. The method according to claim 13, wherein the performance metrics information included in each respective capability information entry comprises accuracy, precision, recall, F1-score, mean squared error, mean absolute error, and confusion matrix information supported during the training phase.

15. The method according to claim 14, wherein the configuration information indicative of at least one configuration option supported for the artificial intelligence or machine learning pipeline comprises at least one of model retraining, model reselection, or model termination.

16. The method according to claim 15, wherein verifying whether the cross-domain related artificial intelligence or machine learning QoS requirements can be satisfied comprises comparing the generated domain-specific artificial intelligence or machine learning QoS requirements with the supported performance metrics and configuration options indicated in the received capability information entry.

17. The method according to claim 16, wherein the third artificial intelligence or machine learning performance related message further includes method trigger information indicative of at least one to-be-triggered configurable method of the artificial intelligence or machine learning pipeline to satisfy the domain-specific artificial intelligence or machine learning QoS requirements.

18. The method according to claim 17, wherein the third artificial intelligence or machine learning performance related message further includes performance metrics configuration information indicative of at least one performance metric to be configured for measurement during an inference phase of the artificial intelligence or machine learning pipeline.

19. The method according to claim 18, wherein the at least one interface is configured to communicate with the second network entity and the third network entity via a cross-domain performance interface dedicated to performance capability discovery and configuration delegation between a cross-domain artificial intelligence pipeline orchestrator and domain-specific entities.

20. The method according to claim 19, wherein the apparatus is a cross-domain artificial intelligence pipeline orchestrator configured to manage artificial intelligence or machine learning pipelines across radio access network, transport network, and core network domains within a multi-vendor cognitive autonomous network environment.

* * * * *